United States Patent
Saxena et al.

(10) Patent No.: US 8,885,701 B2
(45) Date of Patent: Nov. 11, 2014

(54) LOW COMPLEXITY TRANSFORM CODING USING ADAPTIVE DCT/DST FOR INTRA-PREDICTION

(75) Inventors: Ankur Saxena, Richardson, TX (US); Felix Carlos Fernandes, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 535 days.

(21) Appl. No.: 13/226,385

(22) Filed: Sep. 6, 2011

(65) Prior Publication Data

US 2012/0057630 A1    Mar. 8, 2012

Related U.S. Application Data

(60) Provisional application No. 61/380,991, filed on Sep. 8, 2010, provisional application No. 61/427,758, filed on Dec. 28, 2010, provisional application No. 61/444,045, filed on Feb. 17, 2011, provisional application No. 61/449,484, filed on Mar. 4, 2011, provisional application No. 61/473,047, filed on Apr. 7, 2011, provisional application No. 61/475,120, filed on Apr. 13, 2011.

(51) Int. Cl.
| | |
|---|---|
| H04N 7/50 | (2006.01) |
| H04N 19/159 | (2014.01) |
| H04N 19/12 | (2014.01) |
| H04N 19/593 | (2014.01) |
| H04N 19/176 | (2014.01) |
| H04N 19/61 | (2014.01) |

(52) U.S. Cl.
CPC ... *H04N 19/00781* (2013.01); *H04N 19/00218* (2013.01); *H04N 19/00078* (2013.01); *H04N 19/00763* (2013.01); *H04N 19/00278* (2013.01)
USPC .......................................... 375/240

(58) Field of Classification Search
USPC .......................................... 375/240
See application file for complete search history.

(56) References Cited

U.S. PATENT DOCUMENTS 5,957,998 A * 9/1999 Ozaki ........................... 708/402
7,296,045 B2 * 11/2007 Sehitoglu ...................... 708/400

(Continued)

FOREIGN PATENT DOCUMENTS

KR    1020100038060    4/2010

OTHER PUBLICATIONS

International Search Report dated Mar. 19, 2012 in connection International Patent Application No. PCT/KR2011/006680.

(Continued)

*Primary Examiner* — Sath V Perungavoor
*Assistant Examiner* — Howard D Brown, Jr.

(57) ABSTRACT

A method and apparatus encode and decode video by determining whether to use discrete cosine transform (DCT) and DST for each of the horizontal and vertical transforms. During encoding, an intra-prediction is performed based on an intra-prediction mode determined for an M×N input image block to obtain an M×N intra-prediction residue matrix (E). Based on the intra-prediction mode, each of a horizontal transform and a vertical transform is performed using one of DCT and DST according to the intra-prediction mode. During decoding, the intra-prediction mode is determined from an incoming video bitstream. The M×N transformed coefficient matrix of the error residue is obtained from the video bitstream using an inverse quantizer. Based on the intra prediction mode, one of DCT and DST is performed for each of an inverse vertical transform and an inverse horizontal transform.

28 Claims, 10 Drawing Sheets

(56) References Cited

U.S. PATENT DOCUMENTS

| | | | |
|---|---|---|---|
| 7,526,030 B2* | 4/2009 | Yanagihara et al. | 375/240.24 |
| 7,590,296 B2* | 9/2009 | Kobayashi | 382/238 |
| 7,751,572 B2* | 7/2010 | Villemoes et al. | 381/23 |
| 7,817,723 B2* | 10/2010 | Wiegand et al. | 375/240.27 |
| 8,126,950 B2* | 2/2012 | Huang et al. | 708/402 |
| 8,126,951 B2* | 2/2012 | Huang et al. | 708/402 |
| 2007/0276893 A1 | 11/2007 | Huang et al. | |
| 2007/0276894 A1* | 11/2007 | Huang et al. | 708/403 |
| 2009/0238271 A1* | 9/2009 | Kim et al. | 375/240.12 |
| 2010/0177819 A1* | 7/2010 | Jeon et al. | 375/240.2 |
| 2011/0249749 A1* | 10/2011 | Takahashi et al. | 375/240.16 |

OTHER PUBLICATIONS

Written Opinion of the International Searching Authority dated Mar. 19, 2012 in connection International Patent Application No. PCT/KR2011/006680.

Jingning Han, et al., "Towards Jointly Optimal Spatial Prediction and Adaptive Transform in Video/Image Coding", 2010 IEEE, p. 726-729.

Chuohao Yeo, et al., "Mode-Dependent Fast Separable KLT for Block-based Intra Coding", Institute for Infocomm Research, Jul. 21-28, 2010, 7 pages.

* cited by examiner (a) PREDICTION FROM TOP ROW ONLY (b) PREDICTION FROM LEFT COLUMN ONLY

LOW COMPLEXITY TRANSFORM CODING USING ADAPTIVE DCT/DST FOR INTRA-PREDICTION

CROSS-REFERENCE TO RELATED APPLICATION(S) AND CLAIM OF PRIORITY

The present application is related to U.S. Provisional Patent Application No. 61/380,991, filed Sep. 8, 2010, entitled "LOW COMPLEXITY TRANSFORM CODING USING ADAPTIVE DCT/DST FOR INTRA PREDICTION", U.S. Provisional Patent Application No. 61/427,758, filed Dec. 28, 2010, entitled "ON OPTIMALITY OF INTRA-PREDICTION MODE MAPPINGS AND LOCATION SPECIFIC CHOICE FOR ADAPTIVE DCT/DST", U.S. Provisional Patent Application No. 61/444,045, filed Feb. 17, 2011, entitled "LOW COMPLEXITY ALTERNATE TO DST TYPE 7 IN MODE-DEPENDENT DCT/DST FOR INTRA PREDICTION IN VIDEO CODING", U.S. Provisional Patent Application No. 61/449,484, filed Mar. 4, 2011, entitled "FAST IMPLEMENTATION TO DST TYPE 7 IN MODE-DEPENDENT DCT/DST FOR INTRA PREDICTION IN VIDEO CODING", U.S. Provisional Patent Application No. 61/473,047, filed Apr. 7, 2011, entitled "FAST IMPLEMENTATION FOR DST TYPE 7" and U.S. Provisional Patent Application No. 61/475,120, filed Apr. 13, 2011, entitled "FAST IMPLEMENTATION FOR FORWARD AND INVERSE DST TYPE 7". Provisional Patent Applications Nos. 61/380,991, 61/427,758, 61/444,045, 61/449,484, 61/473,047 and 61/475,120 are assigned to the assignee of the present application and is hereby incorporated by reference into the present application as if fully set forth herein. The present application hereby claims priority under 35 U.S.C. §119(e) to U.S. Provisional Patent Applications Nos. 61/380,991, 61/427,758, 61/444,045, 61/449,484, 61/473,047 and 61/475,120.

TECHNICAL FIELD OF THE INVENTION

The present application relates generally to a video encoder/decoder (codec) and, more specifically, to a method and apparatus for implementing a mode-dependent DCT/DST video codec in which discrete cosine transform (DCT) and discrete sine transform (DST) are selected based on intra-prediction residual energy, or simply intra-prediction modes.

BACKGROUND OF THE INVENTION

Most existing image and video-coding standards such as JPEG, H.264/AVC, VC-1, and the upcoming next generation video codec standard HEVC (High Efficiency Video Coding) employ block-based transform coding as a tool to efficiently compress the input image and video signals. The pixel domain data is transformed to frequency domain using a transform process on a block-by-block basis. For typical images, most of the energy is concentrated in the low-frequency transform coefficients. Following the transform, a bigger step-size quantizer can be used for higher-frequency transform coefficients in order to compact energy more efficiently and attain better compression. Hence, it is required to devise the optimal transform for each image block to fully de-correlate the transform coefficients. The Karhunen Loeve Transform (KLT) possesses several attractive properties, e.g., in high resolution quantization of Gaussian signals and full de-correlation of transform coefficients. However, practical use of KLT is limited due to its high computational complexity, and it has been shown in "Discrete cosine transform-algorithms, advantages and applications," by K. R. Rao and P. Yip (1990), that the Discrete Cosine Transform (DCT) provides an attractive alternative to KLT in terms of energy compaction and performance close to KLT. But with the advent of intra-prediction, this is no longer the case and the optimal transform should be adaptive to intra-prediction mode.

In the ongoing standardization of HEVC, non-conventional transforms, in addition to the standard DCT are being investigated for intra-prediction residuals (Robert Cohen et. al., "Tool Experiment 7: MDDT Simplification", ITU-T JCTVC-B307, Geneva, Switzerland, July 2010). These transforms can broadly be categorized into two classes: (a) training-based transforms and (b) model-based transforms. Prominent amongst the training based transforms is the Mode-Dependent Directional Transforms (MDDT) (Y. Ye and M. Karczewicz, "Improved Intra coding," ITU-T Q.6/SG-16 VCEG, VCEG-AG11, Shenzhen, China, October 2007). In MDDT, a large training set of error residuals is collected for each intra-prediction mode and then the optimal transform matrix is computed using the residual training set. However, MDDT requires a large number of transform matrices—up to eighteen at block sizes N=4 and 8. The other class of model-based transform assumes the video signal to be modeled a first order Gauss-Markov process and then the optimal transform is derived analytically. These model based transforms require two transform matrices at a block size.

In J. Han, A. Saxena and K. Rose, "Towards jointly optimal spatial prediction and adaptive transform in video/image coding," IEEE International Conference on Acoustics, Speech and Signal Processing (ICASSP), March 2010, pp. 726-729, a Discrete Sine Transform (DST) was analytically derived with frequency and phase components different from the conventional DCT for the first-order Gauss-Markov model, when the boundary information is available in one direction, as in intra-prediction in H.264/AVC (T. Wiegland, G. J. Sullivan, G. Bjontegaard and A. Luthra, "Overview of the H.264/AVC video coding standard," IEEE Transactions on Circuits and Systems for Video Technology, July 2003). They also showed that if prediction is not performed along a particular direction, then DCT performs close to KLT. The idea was applied to the vertical and horizontal modes in intra-prediction in H.264/AVC and a combination of the proposed DST and conventional DCT was used adaptively. Attempts have been made to extend similar ideas experimentally without a theoretical justification, by applying the combination of DST and DCT to other seven prediction modes in H.264/AVC, and showed that there is only a minor loss in performance in comparison to MDDT (C. Yeo, Y. H. Tan, Z. Li and S. Rahardja, "Mode-dependent fast separable KLT for block-based intra coding," ITU-T JCTVC-B024, Geneva, Switzerland, July 2010).

Also, the DST matrices should be appropriately scaled to take into account the effect of quantization scaling matrices. The prior art does not describe modification of DST matrix coefficients to match the scaling to the DCT in the implementation in the HEVC.

Therefore, there is a need in the art for an improved video codec that improves the compression efficiency and utilizes a low complexity transform.

SUMMARY OF THE INVENTION

According to one aspect of the present disclosure, a method for decoding video is provided. An intra-prediction mode is determined from an incoming video bitstream. Coefficients of the incoming video bitstream are mapped to an M×N transformed coefficient matrix according to an intra-prediction mode of the incoming video bitstream. A first one of discrete cosine transform (DCT) and discrete sine transform (DST) is determined to be applied as an inverse vertical transform, and a second one of DCT and DST is determined to be applied as an inverse horizontal transform for the transformed coefficient matrix according to the intra-prediction mode. An inverse transform comprising the inverse vertical transform and the inverse horizontal transform is is performed, using the first one of DCT and DST for the inverse vertical transform and the second one of DCT and DST for the inverse horizontal transform to calculate an approximation of an error prediction residual to be used for reconstructing image of a video.

According to another aspect of the present disclosure, a method for encoding video is provided. Intra-prediction is performed on an input matrix of an M×N input image block (X) based on an intra-prediction mode to generate a prediction $\tilde{X}$ and obtain an M×N intra-prediction residue matrix (E). A first one of discrete cosine transform (DCT) and discrete sine transform (DST) is determined to be applied as a horizontal transform, and a second one of DCT and DST is determined to be applied as a vertical transform for E according to the intra-prediction mode. A forward transform comprising the horizontal transform and the vertical transform is performed, using the first one of DCT and DST as the horizontal transform and the second one of DCT and DST for the vertical transform to calculate a transformed coefficient matrix ($E_2$).

According to another aspect of the present disclosure, an apparatus for decoding video is provided. The apparatus includes an inverse quantizer and an inverse transform unit. The inverse quantizer maps quantized transformed coefficient indices obtained from an incoming video bitstream to an M×N transformed coefficient matrix according to an intra-prediction mode of the incoming video bitstream. Using the M×N transformed coefficient matrix and the intra prediction mode obtained from the incoming video bitstream, the inverse transform unit determines to apply a first one of discrete cosine transform (DCT) and discrete sine transform (DST) as an inverse vertical transform, and a second one of DCT and DST as an inverse horizontal transform for the transformed coefficient matrix according to the intra-prediction mode, and performs and inverse transform comprising the inverse vertical transform and the inverse horizontal transform, using the first one of DCT and DST for the inverse vertical transform and the second one of DCT and DST for the inverse horizontal transform to calculate an approximation of an error prediction residual.

According to yet another aspect of the present disclosure, an apparatus for encoding a video is provided. The apparatus includes a unified intra-prediction unit and a transform unit. The unified intra-prediction unit performs intra-prediction on an input matrix of an M×N input image block (X) based on an intra-prediction mode to generate $\tilde{X}$ and obtain an M×N intra-prediction residue matrix (E). The transform unit determines to apply a first one of discrete cosine transform (DCT) and discrete sine transform (DST) as a horizontal transform and a second one of DCT and DST as a vertical transform for E according to the intra-prediction mode, and performs a forward transform comprising the horizontal transform and the vertical transform, using the first one of DCT and DST as the horizontal transform and the second one of DCT and DST for the vertical transform to calculate a transformed coefficient matrix ($E_2$).

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1A through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged video encoder or decoder.

The present disclosure is directed to selecting between Discrete Sine Transform (DST) and Discrete Cosine Transform (DCT) for various prediction modes in intra-coding for video. Choosing between DST and conventional DCT based on intra-prediction modes optimally yields substantial compression gains. The embodiments of the present disclosure use a low complexity transform and requires only one DST transform matrix, resulting in a fast implementation of DST. Although embodiments of the present disclosure will be described with reference to the HEVC (High Efficiency Video Coding) standard, one of ordinary skill in the art would recognize that the embodiments may also be applicable to the H.264/AVC standard.

The Joint Collaborative Team on Video Coding (JCT-VC) is considering a Test Model Under Consideration (TMuC) ("Test Model under Consideration," ITU-T JCTVC-B205_draft002, Geneva, Switzerland, July 2010) for standardization of the HEVC video codec.

Figure 1A:
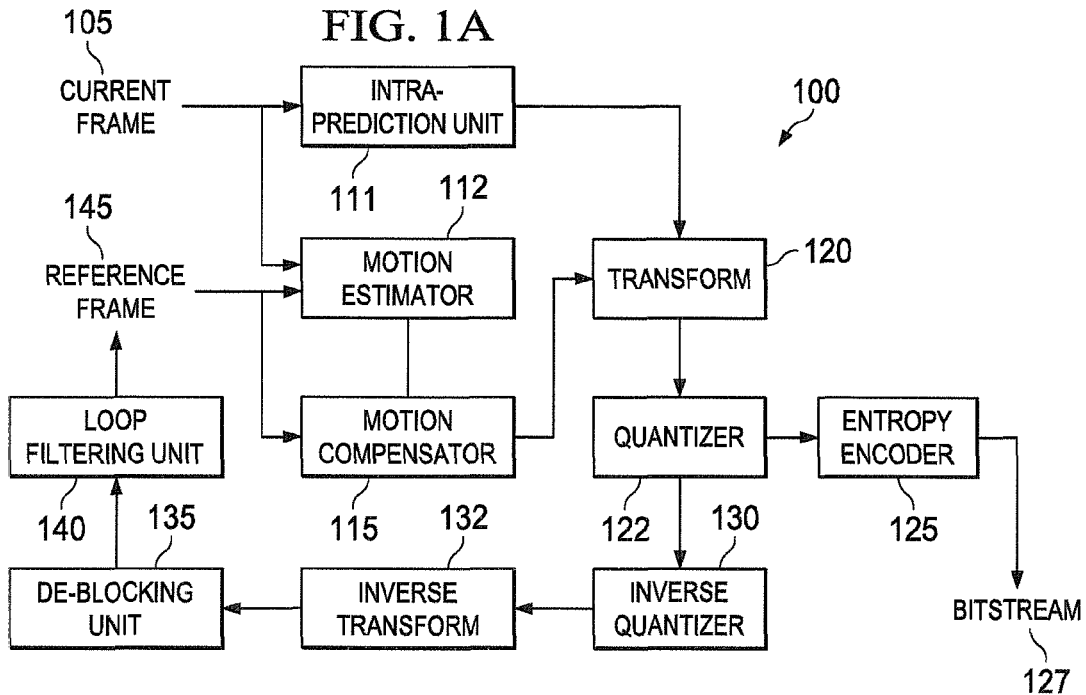
FIG. 1A illustrates a high-level block diagram of a video encoder according to an embodiment of the present disclosure.

FIG. 1A illustrates a high-level block diagram of a video encoder according to an embodiment of the present disclosure. Encoder 100 is based on a coding unit, according to an embodiment of the present invention. An intra prediction unit 111 performs intra prediction on prediction units of the intra mode in a current frame 105, and a motion estimator 112 and a motion compensator 115 performs inter prediction and motion compensation on prediction units of the inter-prediction mode using the current frame 105 and a reference frame 145.

Residual values are generated based on the prediction units output from the intra-prediction unit 111, the motion estimator 112, and the motion compensator 115. The generated residual values are output as quantized transform coefficients by passing through a transform unit 120 and a quantizer 122.

The quantized transform coefficients are restored to residual values by passing through an inverse quantizer 130 and an inverse transform unit 132, and the restored residual values are post-processed by passing through a de-blocking unit 135 and a loop filtering unit 140 and output as the reference frame 145. The quantized transform coefficients may be output as a bitstream 127 by passing through an entropy encoder 125.

Figure 1B:
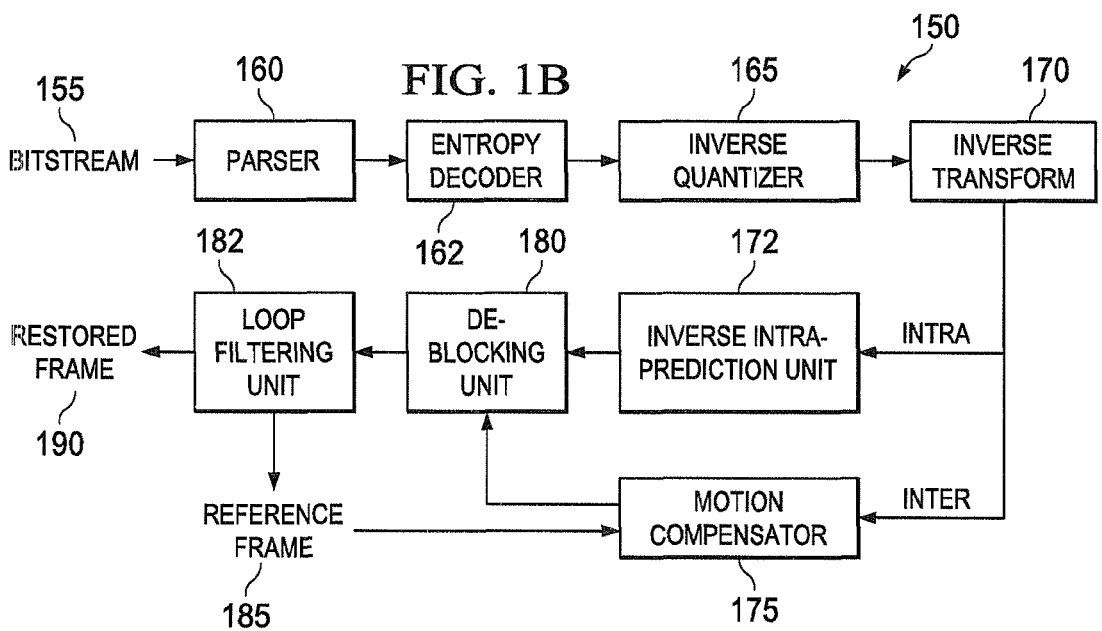
FIG. 1B illustrates a high-level block diagram of a video decoder according to an embodiment of the present disclosure.

FIG. 1B is a high-level block diagram of a video decoder based on a coding unit according to an embodiment of the present disclosure. A bitstream 155 passes through a parser 160 so that encoded image data to be decoded and encoding information necessary for decoding are parsed. The encoded image data is output as inverse-quantized data by passing through an entropy decoder 162 and an inverse quantizer 165 and restored to residual values by passing through an inverse transform unit 170. The residual values are restored according to rectangular block coding units by being added to an intra prediction result of an intra prediction unit 172 or a motion compensation result of a motion compensator 175. The restored coding units are used for prediction of next coding units or a next frame by passing through a de-blocking unit 180 and a loop filtering unit 182.

To perform decoding based on a decoding method according to an embodiment of the present invention, components of the image decoder 150, i.e., the parser 160, the entropy decoder 162, the inverse quantizer 165, the inverse transform unit 170, the intra prediction unit 172, the motion compensator 175, the de-blocking unit 180 and the loop filtering unit 182, perform the image decoding process.

Each functional aspect will now be described.

Intra-Prediction (111/172): Intra-prediction utilizes spatial correlation in each frame to reduce the amount of transmission data necessary to represent the picture. Intra-frame is essentially the first frame to encode but with less amount of compression. Additionally there can be some intra blocks in an inter frame. Intra-prediction involves making predictions within a frame whereas inter-prediction involves making predictions between frames. The present disclosure is mainly focused on intra-prediction.

Motion Estimation (112): The fundamental concept in video compression is to store only incremental changes between frames when inter-prediction is performed. The differences between blocks in two frames are extracted by a Motion Estimation tool. Here a predicted block is reduced to a set of motion vectors and inter-prediction residues.

Motion Compensation (115/175): Motion Compensation will decode the image that is encoded by Motion Estimation. This reconstruction of image is done from received motion vectors and the block in the reference frame.

Transform (120/132/170): The transform unit is used to compress the image in inter-frames or intra-frames. The most commonly used transform is Discrete Cosine Transform (DCT).

Quantization (122/130/165): The quantization stage reduces the amount of information by dividing each transform coefficient by a particular number to reduce the quantity of possible values that each transform coefficient value could have. Because this makes the values fall into a narrower range, this allows entropy coding to express the values more compactly.

De-blocking and Loop Filters (135/140/182): The role of de-blocking is to remove the encoding artifacts due to block-by-block coding of an image. The de-blocking filter acts on the boundaries of the image blocks, and removes the blocking artifacts. The role of the loop filter is to minimize the mean-squared error between the original image pixels and reconstructed image pixels. In a way, the loop filter tries to minimize the directional artifacts caused by block-by-block coding.

Here, portions of the encoder and the decoder have been illustrated as separate units. However, this is not intended to limit the scope of the present disclosure. As shown, the encoder 100 and decoder 150 include several common components. In some embodiments, the encoder and the decoder may be implemented as an integrated unit (e.g., one or more components of a encoder may be used for decoding. Furthermore, one or more components for the encoder and decoder may be implemented in one or more field-programmable gate arrays (FPGAs), application specific integrated circuits (ASICs), processors, microcontrollers, or a combination thereof.

Figure 2:
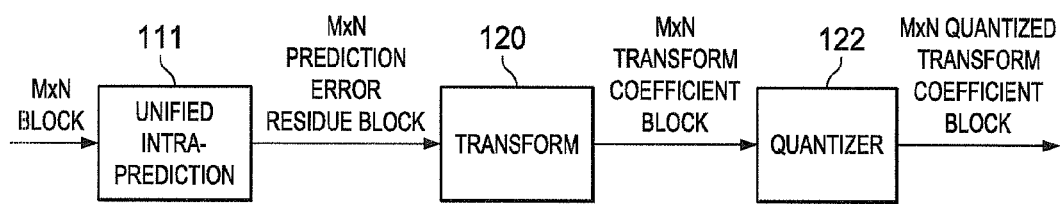
FIG. 2 is a block diagram of a portion of a video encoder according to an embodiment of the present disclosure.

FIG. 2 is a block diagram of a portion of a video encoder according to an embodiment of the present disclosure. The intra prediction unit, also referred to as a "unified intra prediction unit 111" in this document takes a rectangular block of pixels as input, and predicts these pixels using the reconstructed pixels from the blocks already constructed, and a prediction direction according to Min, et al., "Unification of the Directional Intra Prediction Methods in TMuC," ITU-T JCTVC-B100_revision02, Geneva, Switzerland, July 2010 (hereinafter referred to as "ITU-T JCTVC-B100_revision02"). There are different numbers of available intra-prediction modes that have a one-to-one mapping from the intra prediction direction for the various prediction units (e.g. 17 for 4×4; 34 for 8×8, 16×16, and 32×32; 5 for 64×64) as specified by the Unified Directional Intra Prediction (ITU-T JCTVC-B100_revision02). However, these are merely examples as the scope of the present disclosure is not limit thereto. The various intra-prediction modes will be described further below.

Following the prediction, a transform unit 120 applies a transform (e.g. DCT/DST) in both the horizontal and vertical directions. The transform (along horizontal and vertical directions) can either be the conventional DCT or proposed DST, depending on the intra-prediction mode. The transform is followed by the quantizer 122, which reduces the amount of information by dividing each transform coefficient by a particular number to reduce the quantity of possible values that a transform coefficient could have. Because this makes the values fall into a narrower range, this allows entropy coding to express the values more compactly and aid in compression.

In the intra-prediction unit 110, when intra prediction is performed from pixels along a direction as specified by the intra-prediction directional modes (e.g. "Test Model under Consideration," ITU-T JCTVC-B205_draft002, Geneva, Switzerland, July 2010 (hereinafter referred to as "ITU-T JCTVC-B205_draft002"); and ITU-T JCTVC-B100_revision02), the intra-prediction modes can be divided into three categories. The present disclosure will describe the derivation for the new adaptive optimal transform for all of the following three categories:

1. Category 1 oblique modes (FIGS. 3A and 3B): Here prediction is performed entirely from the decoded pixels from either one of the following: the first row (e.g. top row) or the first column (e.g. left column) pixels. The vertical mode '0' and the horizontal mode '1' as described in ITU-T JCTVC-B205_draft002 are special cases of this oblique mode.

2. Category 2 oblique modes (FIG. 4): Here prediction is performed from both the first row (e.g. top row) and the first column (e.g. left column) pixels.

3. DC mode (FIG. 5): Here prediction is performed from an average value of the all the available decoded pixels similar to H.264/AVC also specified in ITU-T JCTVC-B205_draft002.

Figure 6:
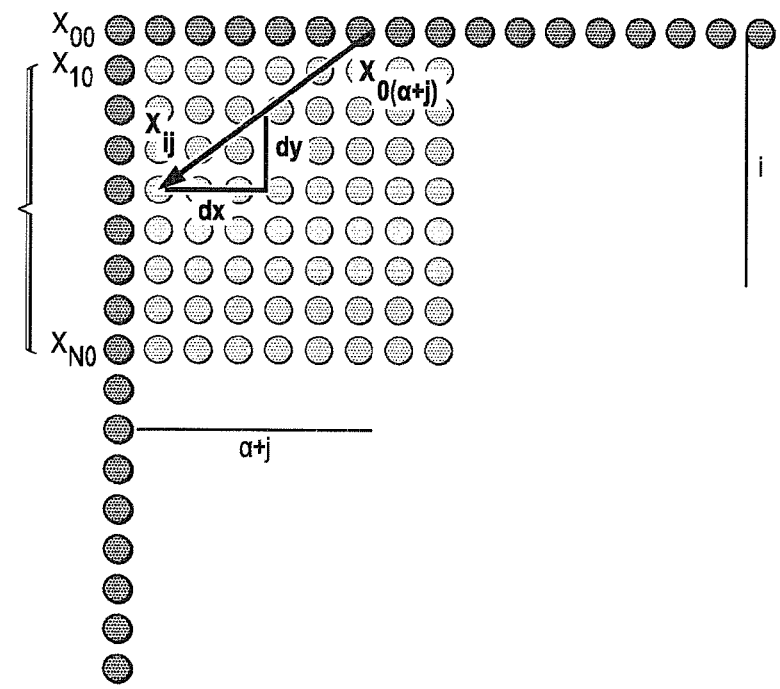
FIG. 6 is a diagram illustrating the derivation of transforms for Category 1 oblique modes according to an embodiment of the present disclosure.

The three categories of intra-prediction directional modes will further be described with reference to FIGS. 6-11. FIG. 6 is a diagram illustrating the derivation of transforms for Category 1 oblique modes according to an embodiment of the present disclosure. Here, prediction is performed from the first row (e.g., top row) in the direction showed by the arrows. In another embodiment, the first row may not necessarily be the top row. In an alternative embodiment (similar to FIG. 3B), prediction may be performed from a first column (e.g. left row). Specifically a (dx, dy) pair denotes the horizontal and vertical distance respectively and can indicate the prediction direction.

Equation 1, below, assumes the Gauss-Markov model for the image pixels in the context of a one-dimension line: row or column (In the following discussion we use column when we mean one-dimension line):

$$x_k = \rho x_{k-1} + e_k \quad [\text{Eqn. 1}]$$

where $\rho$ is the correlation coefficient between the pixels, $e_k$ is a white-noise process with zero mean, variance of $1-\rho^2$, and the row/column index k=0 ... N. Here $x_0$ denotes the boundary pixel and $x_1$ to $x_N$ are the pixels to be encoded. The correlation between pixels $x_k$ and $x_l$ is given by Equation 2:

$$R_{kl} = \rho^{|k-l|} \quad [\text{Eqn. 2}]$$

where $R_{kl}$ (also interpreted as $R_{k,l}$) denotes the correlation between pixels $x_k$ and $x_l$, l and k denote the column indices. For the 2D image situation, we assume a separable model along the horizontal and vertical directions. Hence the correlation between pixels $x_{ij}$ and $x_{mn}$ (also represented as $x_{i,j}$ and $x_{m,n}$) is denoted according to Equation 3:

$$\rho^{|i-m|}\rho^{|j-n|} = \rho^{|i-m|+|j-n|} \quad [\text{Eqn. 3}]$$

where i denotes the row index of pixel $x_{ij}$, m denotes the row index of pixel $x_{mn}$, j denotes the column index of pixel $x_{ij}$, and l2 denotes the column index of pixel $x_{mn}$. In FIG. 6, the pixels $x_{00}, x_{01}, x_{02}, \ldots x_{0N}$, and $x_{10}, x_{20}, \ldots x_{N0}$, denote the boundary pixels (e.g. the first row and first column) that have already been encoded. Pixels $x_{ij}$ (i, j ∈ {1 ... N}) denote the pixels to be encoded. Let the prediction for a pixel $x_{ij}$ be given according to Equation 4 below:

$$\tilde{x}_{ij} = x_{0(\alpha+j)} \quad [\text{Eqn. 4}]$$

where $\tilde{x}_{ij}$ denotes the prediction for pixel $x_{ij}$, and $\alpha$ (a non-negative number) denotes the horizontal distance of pixel $x_{ij}$ from the pixel $x_{0(\alpha+j)}$, the pixel on the first row used for predicting $x_{ij}$. Note when $\alpha$ is not an integer, the pixel $x_{0(\alpha+j)}$ is interpolated in any manner (e.g. from its adjacent two neighboring pixels as specified in ITU-T JCTVC-B205_draft002), but for simplicity, we keep the predictor as $x_{0(\alpha+j)}$ only for analysis purposes. From the property of similar triangles, we can derive Equation 5:

$$\alpha = \left(\frac{dx}{dy}\right)i \quad [\text{Eqn. 5}]$$

Hence, the prediction error residue is given according to Equation 6:

$$e_{ij} = x_{ij} - \tilde{x}_{ij} = x_{ij} - x_{0(\alpha+j)} \quad [\text{Eqn. 6}]$$

The overall matrix for the error-residues for the N×N image block is given according to Equation 7:

$$E = X - \tilde{X} \quad [\text{Eqn. 7}]$$

where X is the original N×N image block, and $\tilde{X}$ is its prediction. Element 'ij' of Matrix E is given according to Equation 6.

Assuming the separable pixel model, we seek to find the optimal transforms in both the vertical and horizontal directions for the above prediction residue matrix. Specifically for finding the vertical transform of a column of E, a matrix which diagonalizes the autocorrelation matrix of the corresponding columns is determined. Similar for the horizontal transform for a particular row of E, we seek a matrix which diagonalizes the autocorrelation matrix of that particular row. For example, we first consider column 'j' of E according to Equation 8:

$$E_j = \begin{bmatrix} e_{1j} \\ e_{2j} \\ \vdots \\ e_{Nj} \end{bmatrix} = \begin{bmatrix} x_{1j} - x_{0\left(j+1\frac{dx}{dy}\right)} \\ x_{2j} - x_{0\left(j+2\frac{dx}{dy}\right)} \\ \vdots \\ x_{Nj} - x_{0\left(j+N\frac{dx}{dy}\right)} \end{bmatrix} \quad \text{[Eqn. 8]}$$

The autocorrelation matrix of column $E_j$ is a N×N matrix given by:

$$R_{Col} = \mathbb{E}(E_j E_j^T) = \mathbb{E}\left(\begin{bmatrix} e_{1j} \\ e_{2j} \\ \vdots \\ e_{Nj} \end{bmatrix} \begin{bmatrix} e_{1j} & e_{2j} & \cdots & e_{Nj} \end{bmatrix}\right) \quad \text{[Eqn. 8]}$$

where $\mathbb{E}(\cdot)$ denotes the Expectation operator. The term 'ik' of the above matrix is denoted as $R_{Col,ik}$ in Equations 9a-c below:

$$R_{Col,ik} = \mathbb{E}(e_{ij} e_{kj}) \quad \text{[Eqn. 9a]}$$
$$= \mathbb{E}\left[\left(x_{ij} - x_{0\left(j+i\frac{dx}{dy}\right)}\right)\left(x_{kj} - x_{0\left(j+k\frac{dx}{dy}\right)}\right)\right]$$

$$= \mathbb{E}\left[x_{ij} x_{kj} + \right. \quad \text{[Eqn. 9b]}$$
$$\left. x_{0\left(j+i\frac{dx}{dy}\right)} x_{0\left(j+k\frac{dx}{dy}\right)} - x_{ij} x_{0\left(j+k\frac{dx}{dy}\right)} - x_{kj} x_{0\left(j+i\frac{dx}{dy}\right)}\right]$$

$$= \rho^{|i-k|} + \rho^{\left|(i-k)\frac{dx}{dy}\right|} - \rho^{i+k\left|\frac{dx}{dy}\right|} - \rho^{k+i\left|\frac{dx}{dy}\right|} \quad \text{[Eqn. 9c]}$$

From the above expression, it can be seen that $\rho=1$ is a factor of all the terms in the matrix $R_{Col}$. We can factorize a constant $C \equiv 1 - \rho$ from $R_{Col}$. Note that $\rho$ is the correlation coefficient between the image pixels and, in general, is typically near but not equal to '1'. With this assumption, we can approximate $R_{Col,ik}$ according to Equations 10a-b:

$$R_{Col,ik} = c \cdot \lim_{\rho \to 1} \frac{R_{Col,ik}}{1-\rho} \quad \text{[Eqn. 10a]}$$

$$= c \cdot (-1) \cdot \left[ \quad \text{[Eqn. 10b]} \right.$$
$$\left. |i-k| + \left|(i-k)\frac{dx}{dy}\right| - \left(i+k\left|\frac{dx}{dy}\right|\right) - \left(k+i\left|\frac{dx}{dy}\right|\right)\right]$$

where L'Hopital's rule is applied. This can be further simplified to Equation 11:

$$R_{Col,ik} = 2c\left(1 + \left|\frac{dx}{dy}\right|\right) \min(i,k) \quad \text{[Eqn. 11]}$$

To find a matrix which diagonalizes $R_{Col}$, one can ignore the constant terms $$2c\left(1 + \left|\frac{dx}{dy}\right|\right),$$

and find the matrix which diagonalizes the following matrix $M \equiv \min(i,k)$, or equivalently, $M^{-1}$ according to Equations 12a and 12b:

$$M \equiv \begin{bmatrix} 1 & 1 & 1 & 1 & \cdots & \cdots & \cdots & 1 \\ 1 & 2 & 2 & 2 & \cdots & \cdots & \cdots & 2 \\ 1 & 2 & 2 & 2 & \cdots & \cdots & \cdots & 3 \\ 1 & 2 & 3 & 4 & \cdots & \cdots & \cdots & 4 \\ \cdots & \cdots & \cdots & \cdots & \cdots & \cdots & \cdots & \cdots \\ \cdots & \cdots & \cdots & \cdots & \cdots & \cdots & \cdots & \cdots \\ \cdots & \cdots & \cdots & \cdots & \cdots & \cdots & \cdots & \cdots \\ 1 & 2 & 3 & 4 & \cdots & \cdots & \cdots & N \end{bmatrix} \quad \text{[Eqn. 12a]}$$

$$M^{-1} \equiv \begin{bmatrix} 2 & -1 & 0 & \cdots & \cdots & \cdots & \cdots & 0 \\ -1 & 2 & -1 & \cdots & \cdots & \cdots & \cdots & \cdots \\ 0 & -1 & 2 & \cdots & \cdots & \cdots & \cdots & \cdots \\ \cdots & 0 & -1 & 2 & \cdots & \cdots & \cdots & \cdots \\ \cdots & \cdots & \cdots & \cdots & \cdots & \cdots & \cdots & \cdots \\ \cdots & \cdots & \cdots & \cdots & \cdots & \cdots & \cdots & \cdots \\ \cdots & \cdots & \cdots & \cdots & \cdots & \cdots & \cdots & -1 \\ 0 & \cdots & \cdots & \cdots & \cdots & 0 & -1 & 1 \end{bmatrix} \quad \text{[Eqn. 12b]}$$

The KLT (Karhunen Loeve Transform) of the above matrix (from W. C. Yueh, "Eigenvalues of several tridiagonal matrices," Applied Mathematics E-Notes, vol. 5, pp. 66-74, April 2005) is the following sine transform in Equation 13:

$$[T_S]_{i,j} = \frac{2}{\sqrt{2N+1}} \sin\frac{(2i-1)j\pi}{2N+1} \quad \text{[Eqn. 13]}$$

Note that the above expression is independent of column 'j' of the error residue. Hence, the above DST can be applied as the vertical transform on all the columns of the intra-prediction residue E.

Next, we consider the horizontal transform to be applied to row 'i' of E. The autocorrelation matrix for row 'i' may be represented according to Equation 14:

$$R_{row} = \mathbb{E}\left(\begin{bmatrix} e_{i1} \\ e_{i2} \\ \vdots \\ e_{iN} \end{bmatrix} \begin{bmatrix} e_{i1} & e_{i2} & \cdots & e_{iN} \end{bmatrix}\right) \quad \text{[Eqn. 14]}$$

The term 'mn' of the above matrix is denoted by $R_{row,mn}$ in Equations 15a-c below:

$$R_{row,mn} = \mathbb{E}(e_{im} \cdot e_{in}) \quad \text{[Eqn. 15a]}$$
$$= \mathbb{E}\left[\left(x_{im} - x_{0\left(m+i\frac{dx}{dy}\right)}\right)\left(x_{in} - x_{0\left(n+i\frac{dx}{dy}\right)}\right)\right]$$

$$= \mathbb{E}\left[x_{im} x_{in} + x_{0\left(m+i\frac{dx}{dy}\right)} x_{0\left(n+i\frac{dx}{dy}\right)} - \right. \quad \text{[Eqn. 15b]}$$
$$\left. x_{in} x_{0\left(m+i\frac{dx}{dy}\right)} - x_{im} x_{0\left(n+i\frac{dx}{dy}\right)}\right]$$

$$= \rho^{|m-n|} + \rho^{|m-n|} - \rho^{i+\left|m-n+i\frac{dx}{dy}\right|} - \rho^{i+\left|m-n-i\frac{dx}{dy}\right|} \quad \text{[Eqn. 15c]}$$

Again, $\rho=1$ is a factor of all the terms in the matrix $R_{row}$. The term 'mn' of $R_{row}$ may be simplified based on a similar procedure used for $R_{col}$ to derive Equations 16a, 16b, and 17:

$$R_{row,mn} = c \cdot \lim_{\rho \to 1} \frac{R_{row,mn}}{1-\rho} \quad [\text{Eqn. 16a}]$$

$$= c \cdot (-1) \cdot [|m-n| + |(m-n)| - \quad [\text{Eqn. 16b}]$$

$$\left(i + \left|m - n + i\frac{dx}{dy}\right|\right) - \left(i + \left|m - n - i\frac{dx}{dy}\right|\right)$$

$$R_{row,mn} = c \cdot \left[2i + \left|m - n + i\frac{dx}{dy}\right| + \left|m - n - i\frac{dx}{dy}\right| - 2|m-n|\right] \quad [\text{Eqn. 17}]$$

Figure 3A:
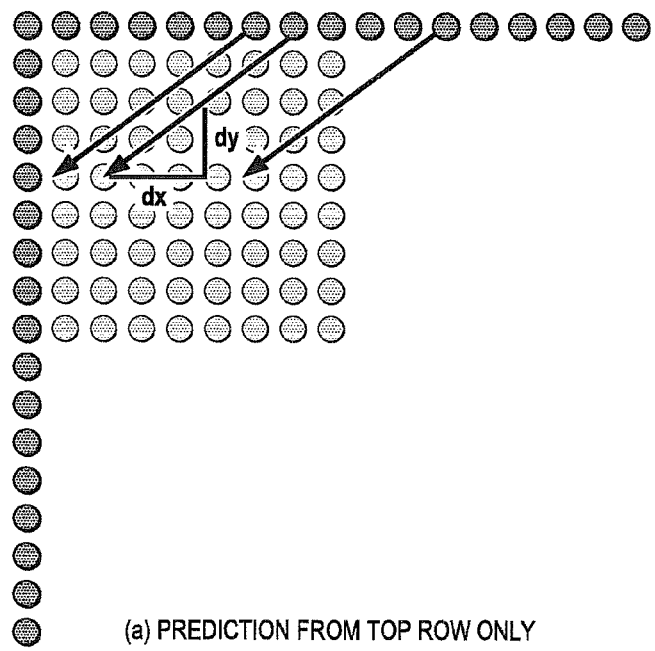
FIGS. 3A and 3B are diagrams illustrating prediction of image pixels using the Category 1 oblique modes, according to an embodiment of the present disclosure.
Figure 3B:
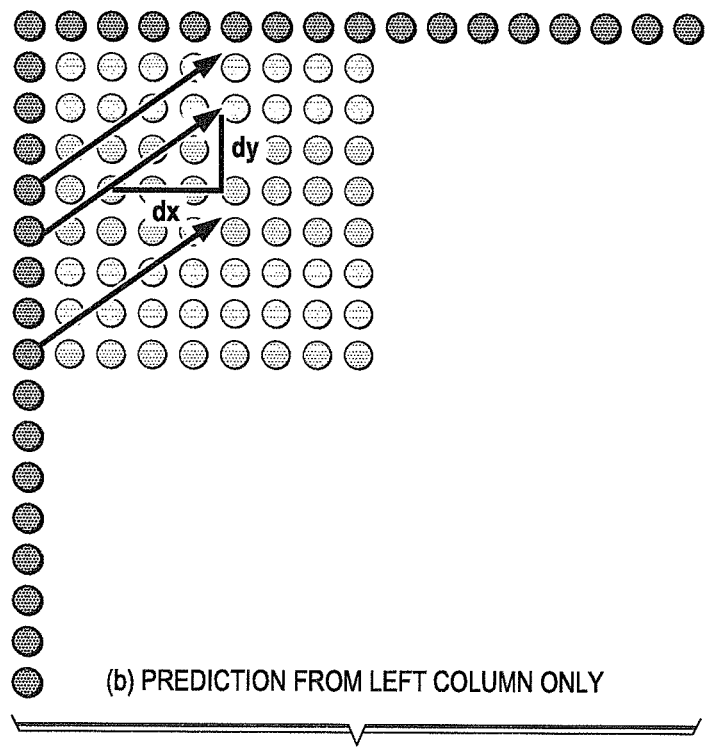
Figure 4:
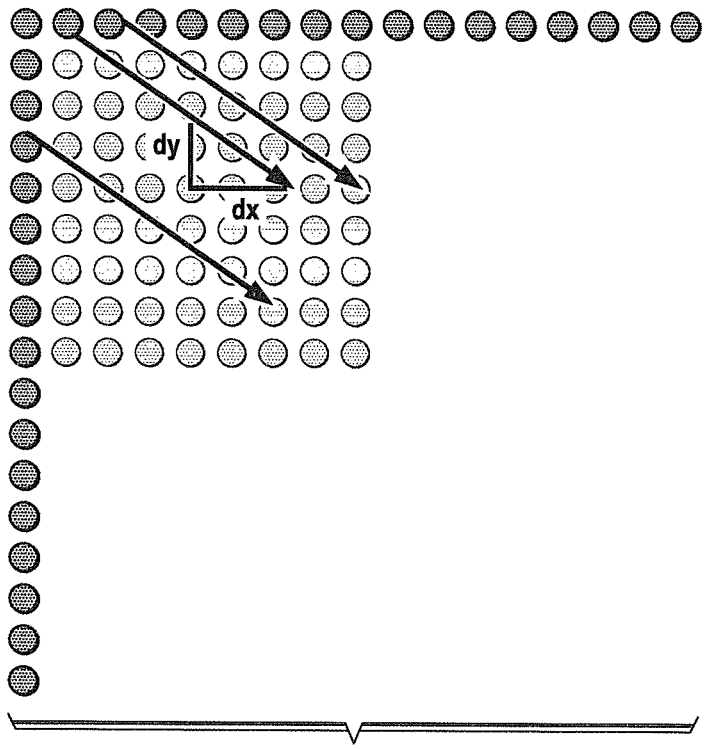
FIG. 4 is a diagram illustrating prediction of image pixels using the Category 2 oblique modes, according to an embodiment of the present disclosure.
Figure 5:
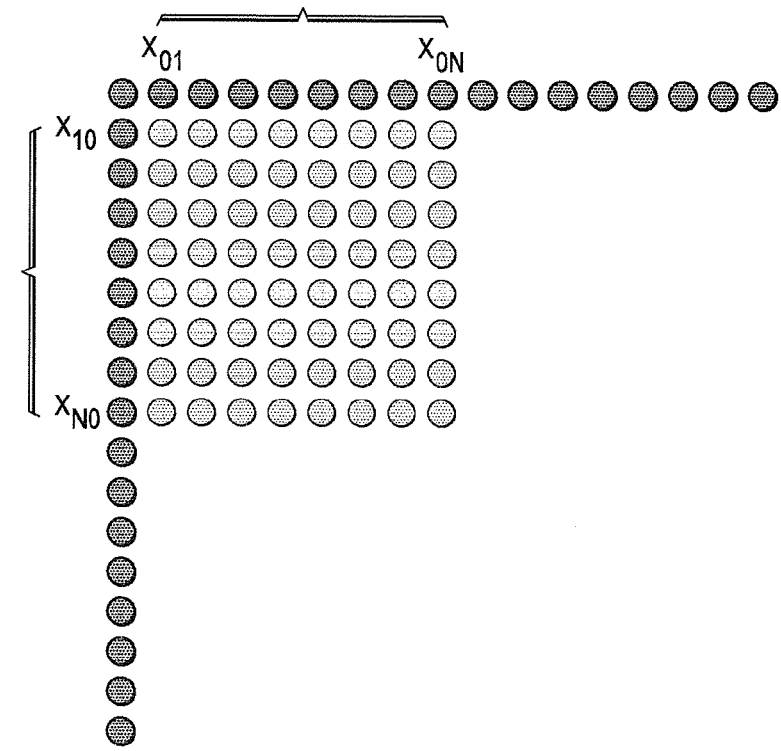
FIG. 5 is a diagram illustrating prediction of image pixels using the DC prediction mode, according to an embodiment of the present disclosure.

The term 'mn' of the matrix $R_{row}$ is dependent on (m−n), given the row 'i' and hence the matrix $R_{row}$ is Toeplitz. It has been shown that DCT performs close to the KLT for the case of Toepliz matrices (K. R. Rao and P. Yip, "Discrete cosine transform-algorithms, advantages and applications," Academic Press-1990). So DCT can be applied as the horizontal transform for all the rows. To summarize, one may apply: 1) DST as the vertical transform, and 2) DCT as the horizontal transform for the Category 1 oblique modes shown in FIG. 3A. By symmetry, it may be concluded that the DST should be applied as the horizontal transform and DCT as the vertical transform when prediction is applied in the horizontal direction as shown in FIG. 3B.

For the Category 1 modes in HEVC, Table 1 indicates the choice of DCT/DST for horizontal and vertical transforms based on the intra prediction mode.

TABLE 1

Choice of DCT/DST Transform as the horizontal and vertical transform for Category 1 Oblique Modes

| Intra-Prediction Mode | Intra-Prediction Type | Intra-Prediction Angle ID | Category of Oblique Mode | Row (Horizontal) Transform | Column (Vertical) Transform |
|---|---|---|---|---|---|
| 0 | Intra_Vertical | 0 | 1 | DCT | DST |
| 1 | Intra_Horizontal | 0 | 1: Prediction from Left Column | DCT | DST |
| 5 | Intra_Vertical | +4 | 1 | DCT | DST |
| 6 | Intra_Vertical | +8 | 1 | DCT | DST |
| 8 | Intra_Horizontal | +4 | 1 | DST | DCT |
| 9 | Intra_Horizontal | +8 | 1 | DST | DCT |
| 12 | Intra_Vertical | +2 | 1 | DCT | DST |
| 13 | Intra_Vertical | +6 | 1 | DCT | DST |
| 16 | Intra_Horizontal | +2 | 1 | DST | DCT |
| 17 | Intra_Horizontal | +6 | 1 | DST | DCT |
| 22 | Intra_Vertical | +1 | 1 | DCT | DST |
| 23 | Intra_Vertical | +3 | 1 | DCT | DST |
| 24 | Intra_Vertical | +5 | 1 | DCT | DST |
| 25 | Intra_Vertical | +7 | 1 | DCT | DST |
| 30 | Intra_Horizontal | +1 | 1 | DST | DCT |
| 31 | Intra_Horizontal | +3 | 1 | DST | DCT |
| 32 | Intra_Horizontal | +5 | 1 | DST | DCT |
| 33 | Intra_Horizontal | +7 | 1 | DST | DCT |

Figure 7A:
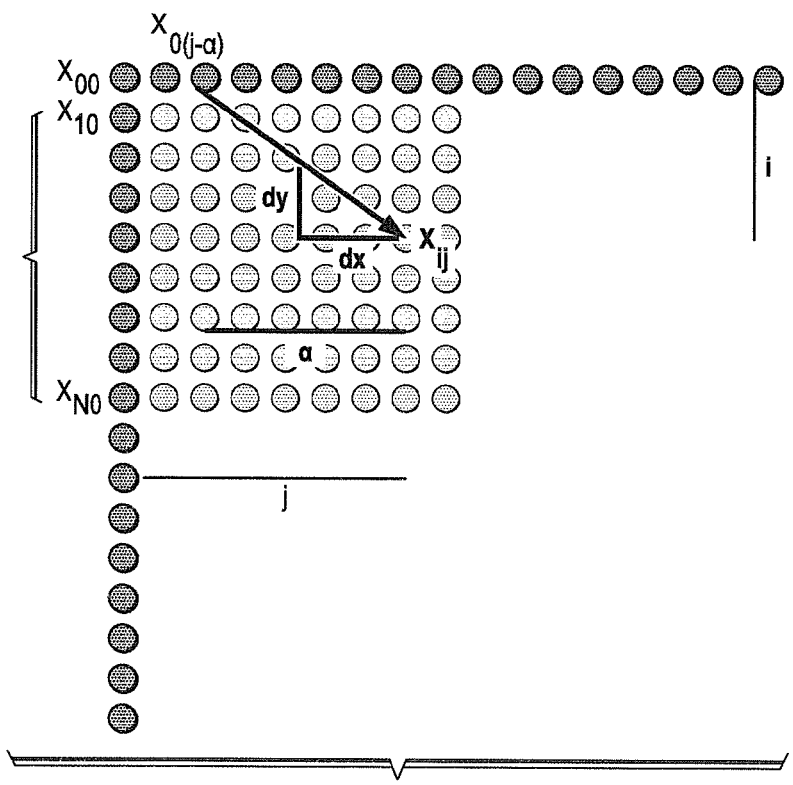
FIGS. 7A and 7B are diagrams illustrating the derivation of transforms for Category 2 oblique modes according to an embodiment of the present disclosure.
Figure 7B:
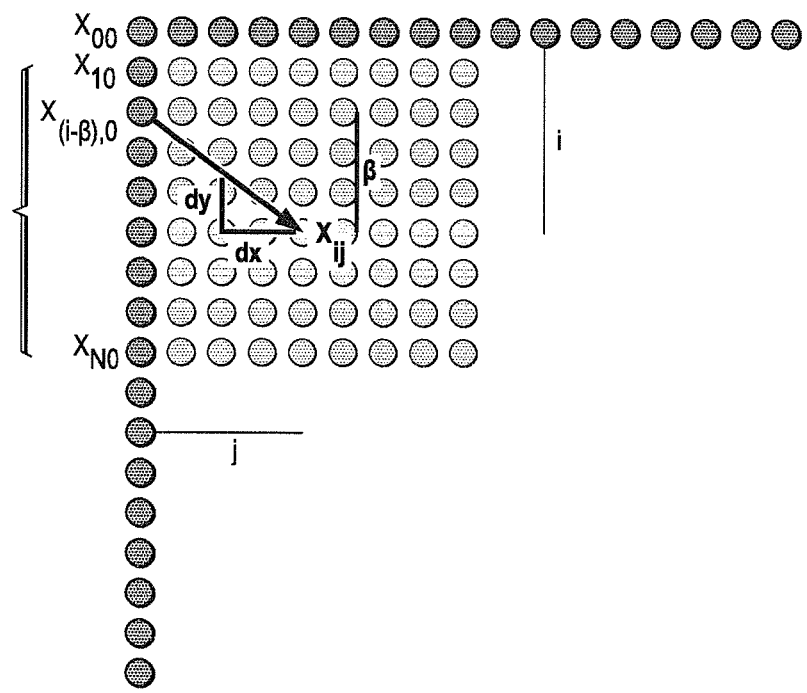

FIGS. 7A and 7B are diagrams illustrating the derivation of transforms for Category 2 oblique modes according to an embodiment of the present disclosure. In Category 2, intra-prediction is performed from both the top row and the left column in the direction shown by the arrows. According to an embodiment, a (dx, dy) pair may denote the horizontal and vertical distance, respectively, and can indicate the prediction direction.

Equation 18, below, assumes the Gauss-Markov model for the image pixels in the context of 1D:

$$x_k = \rho x_{k-1} + e_k \quad [\text{Eqn. 18}]$$

where $\rho$ denotes the correlation between the pixels, $e_k$ denotes a white-noise process with a zero mean and variance of $1-\rho^2$, and index k=0 ... N. Here, $x_0$ denotes the boundary pixel and $x_1$ to $x_N$ are the pixels to be encoded. The correlation between pixels $x_k$ and $x_l$ is given by Equation 2. For a 2D image, a separable model is assumed along the horizontal and vertical directions. Hence, the correlation between pixels $x_{ij}$ and $x_{mn}$ (also represented as $x_{i,j}$ and $x_{m,n}$) is determined according to Equation 3.

In FIG. 7A, the pixels $x_{00}$, $x_{01}$, $x_{02}$, ... $x_{0N}$, and $x_{10}$, $x_{20}$, ... $x_{N0}$, denote the boundary pixels (e.g. the first row and first column) that have already been encoded. Pixels $x_{ij}$ (i, j ∈ {1 ... N}) denote the pixels to be encoded. As shown with reference to Category 1 oblique modes, the prediction for a pixel $x_{ij}$ is given by $\tilde{x}_{ij}$. When the prediction is from the first row (e.g. the top row), the predictor is given by $x_{0(j-\alpha)}$ as shown with regard to FIG. 7A. Here $x_{0(j-\alpha)}$ is actually an interpolated pixel from the adjoining pixels in the top row, but for simplicity, we assume "j-α" to be an actual physical location in the top row. From the property of similar triangles, Equation 19 is derived:

$$\alpha = j - i(dx/dy) \quad [\text{Eqn. 19}]$$

In contrast, when the prediction is performed from the left column (as shown in FIG. 7B), the prediction for $x_{ij}$ may be determined according to Equation 20:

$$\tilde{x}_{ij} = x_{(i-\beta), 0} \quad [\text{Eqn. 20}]$$

Again, by the property of similar triangles, β may be determined according to Equation 21:

$$\beta = i - j(dy/dx) \quad [\text{Eqn. 21}]$$

and, hence, the prediction error residual is given by Equation 22:

$$e_{ij} = x_{ij} - \tilde{x}_{ij} = x_{ij} - x_{(i-j(dy/dx)), 0} \quad [\text{Eqn. 22}]$$

Combining the above two situations (i.e. performing prediction from the top row and performing prediction from the left column), for pixel 'i' in column 'j', the predictor $\tilde{x}_{ij}$ may be re-defined as $\tilde{x}_{iRow,jCol}$ for notational simplicity, where the pair (iRow, iCol) is given by Equations 23a-b:

$i$Row=0; $i$Col=$j-i(dx/dy)$, when the prediction is from
the top row, and $i \leq j(dy/dx)$ [Eqn. 23a]

$i$Row=$i-j(dy/dx)$; $i$Col=0, when the prediction is from
the top row, and $i > j(dy/dx)$ [Eqn. 23b]

The prediction error residue for a pixel is given according to Equation 24:

$$e_{ij} = x_{ij} - \hat{x}_{ij} = x_{ij} - x_{iRow,iCol} \quad \text{[Eqn. 24]}$$

The overall matrix (E) for the error-residues for the N×N image block is determined according to Equation 7, and element 'ij' of matrix E is given according to Equation 24. Assuming a similar to the analysis for Category 1 oblique modes, we seek to find the optimal transforms in both the vertical and horizontal directions for the above prediction residue matrix E. Specifically for finding the vertical transform of a column of E, a matrix which diagonalizes the autocorrelation matrix of the corresponding columns is determined. Similar for the horizontal transform for a particular row of E, we seek a matrix which diagonalizes the autocorrelation matrix of that particular row. For example, we first consider column 'j' of E according to Equation 25:

$$E_j = \begin{bmatrix} e_{1j} \\ e_{2j} \\ \vdots \\ \vdots \\ e_{Nj} \end{bmatrix} \quad \text{[Eqn. 25]}$$

The autocorrelation matrix of column $E_j$ is a N×N matrix given by Equation 8. The term 'ik' of the above matrix is denoted by $R_{Col,ik}$ in Equations 26a-c:

$$R_{Col,ik} = \mathbb{E}(e_{ij} \cdot e_{kj}) \quad \text{[Eqn. 26a]}$$

$$= \mathbb{E}[(x_{ij} - x^j_{iRow,iCol})(x_{kj} - x^k_{iRow,iCol})]$$

$$= \mathbb{E}[x_{ij}x_{kj} + x^j_{iRow,iCol}x^k_{iRow,iCol} - \quad \text{[Eqn. 26b]}$$
$$x_{ij}x^k_{iRow,jCol} - x_{kj}x^j_{iRow,iCol}]$$

$$= \rho^{|i-k|} + \rho^{|iRow-kRow|+|iCol-kCol|} -$$

$$\rho^{|i-kRow|+|j-kCol|} - \rho^{|iRow-k|+|iCol-j|} \quad \text{[Eqn. 26c]}$$

where the entities iRow, iCol, kRow, and kCol are dependent on i, j, and k as described above. If the entries of the matrix $R_{Col}$ are independent of the column j, then the optimal transform would be DST as was the case in Category 1 Oblique Modes. But here, the entries in the matrix $R_{Col}$ are dependent on column j, and hence, DST will not be the KLT. In fact, it is difficult to find the actual KLT of this matrix analytically. However, we can evaluate the performance of the various transforms: DST and the conventional DCT used in video coding compared to KLT, numerically. To that end, we can measure the relative coding gain of DST and DCT (more details on coding gain of transform matrices may be found in A. Gersho and R. M. Gray, "Vector Quantization and Signal Compression," Kluwer Academic Publishers, 1992).

Let A denote any N×N ortho-normal transform (DCT or DST) to be applied on column 'j' of error-residual, i.e., $E_j$. The transform coefficients are given by Equation 27:

$$Y = AE_j \quad \text{[Eqn. 27]}$$

The autocorrelation matrix of Y is given according to Equation 28:

$$\mathbb{E}[YY^T] = \mathbb{E}[AE_jE_j^TA^T] = A\mathbb{E}[E_jE_j^T]A^T = AR_{Col} \quad \text{[Eqn. 28]}$$

Let the variances of the elements $y_1, y_2, \ldots y_N$, in Y be given as $\sigma_1^2, \sigma_2^2, \ldots \sigma_N^2$, which can be obtained as the diagonal entries of the above matrix $E[YY^T]$ and the geometric mean be given as $G_{j,A}$, where the sub-script 'j' denotes the column on which transform A is applied. The relative coding gain $CG_j$ of DST over DCT for column 'j' is then determined according to Equation 29:

$$CG_j = \frac{G_{j,DCT}}{G_{j,DST}} \quad \text{[Eqn. 29]}$$

Furthermore, if we assume that the contribution of all the N columns of a N×N block to overall distortion is similar, then the average coding gain of DST over DCT is given by Equation 30:

$$CG = \frac{1}{N} \sum_j CG_j \quad \text{[Eqn. 30]}$$

If the coding gain CG>'1' or CG (in dB)>'0', then the performance of DST will be better as compared to DCT for that particular intra-prediction mode and block size N.

According to an embodiment, in unified intra-prediction, the prediction angles are given as follows: [2, 5, 9, 13, 17, 21, 26, 32]=. These correspond to the value dx/dy for the intra-prediction modes: VER-1, VER-2, . . . VER-8. As an example for the intra prediction mode VER-2, the value of (dx/dy) is 5=, for VER-8, it is 32=and so on. Similarly for the horizontal intra-prediction modes HOR-1, HOR-2, . . . HOR-7, the values of dy/dx=1/(dx/dy) are given by [2, 5, 9, 13, 17, 21, 26]=

A particular prediction mode can be specified via the (dx/dy) value. The steps to choose between the Sine or Cosine transform as the Vertical transform for a particular block size N and intra-prediction mode can be summarized as follows:

Input N=BlockSize; Intra Prediction Mode→Specified by (dx/dy) value

1. For each column j=1 . . . N
    (a) Calculate the autocorrelation matrix for column 'j', i.e. $R_{Col,j}$ numerically, for a given value of $\rho$.
    (b) Obtain the coding gain of DST over DCT for column j according to Equation 29, i.e., $$CG_j = \frac{G_{j,DCT}}{G_{j,DST}}.$$

2. Calculate the overall coding gain of DST over DCT according to Equation 30. If CG>'1', use DST; otherwise, use DCT.

The above-described process is applied for all the intra-prediction modes at a particular block size. Typically, the value of correlation coefficient between the pixels $\rho$ can be assumed to be approximately 0.95 for naturally occurring video signals. Tables 2 and 3 provide the choice of "Vertical" transform for different values of $\rho$=0.9, 0.95, and 0.99, and for block sizes N=4×4, 8×8, 16×16 and 32×32, together with the Coding Gain CG of DST over DCT based on the above analysis.

TABLE 2

Coding Gain of DST over DCT (in dB) for a subset of Vertical Modes

| Block Size | Corr. Coeff. ρ | VER-1 | VER-2 | VER-3 | VER-4 | VER-5 | VER-6 | VER-7 | VER-8 |
|---|---|---|---|---|---|---|---|---|---|
| 4  | 0.9  | 0.5523 | 0.5415 | 0.5219 | 0.4806 | 0.4446 | 0.3895 | 0.3090 | 0.2605 |
| 4  | 0.95 | 0.6163 | 0.6106 | 0.5945 | 0.5509 | 0.5145 | 0.4571 | 0.3653 | 0.3128 |
| 4  | 0.99 | 0.6691 | 0.6679 | 0.6552 | 0.6102 | 0.5740 | 0.5156 | 0.4141 | 0.3589 |
| 8  | 0.9  | 0.4837 | 0.4726 | 0.4482 | 0.4180 | 0.3851 | 0.3523 | 0.3092 | 0.2688 |
| 8  | 0.95 | 0.5543 | 0.5464 | 0.5236 | 0.4932 | 0.4569 | 0.4219 | 0.3719 | 0.3247 |
| 8  | 0.99 | 0.6140 | 0.6096 | 0.5891 | 0.5594 | 0.5205 | 0.4846 | 0.4283 | 0.3747 |
| 16 | 0.9  | 0.3340 | 0.3235 | 0.3058 | 0.2885 | 0.2705 | 0.2531 | 0.2314 | 0.2095 |
| 16 | 0.95 | 0.4020 | 0.3914 | 0.3732 | 0.3550 | 0.3341 | 0.3137 | 0.2868 | 0.2598 |
| 16 | 0.99 | 0.4630 | 0.4539 | 0.4371 | 0.4197 | 0.3966 | 0.3734 | 0.3404 | 0.3068 |
| 32 | 0.9  | 0.1961 | 0.1914 | 0.1835 | 0.1753 | 0.1670 | 0.1588 | 0.1487 | 0.1379 |
| 32 | 0.95 | 0.2525 | 0.2456 | 0.2349 | 0.2246 | 0.2140 | 0.2038 | 0.1910 | 0.1777 |
| 32 | 0.99 | 0.3094 | 0.3035 | 0.2931 | 0.2826 | 0.2701 | 0.2569 | 0.2396 | 0.2214 |

TABLE 3

Coding Gain of DST over DCT (in dB) for a subset of Horizontal Modes

| Block Size | Corr. Coeff. ρ | HOR-6 | HOR-7 |
|---|---|---|---|
| 4  | 0.9  | 0.0432 | 0.1486 |
| 4  | 0.95 | 0.0480 | 0.1762 |
| 4  | 0.99 | 0.0492 | 0.1993 |
| 8  | 0.9  | 0.1379 | 0.2052 |
| 8  | 0.95 | 0.1536 | 0.2412 |
| 8  | 0.99 | 0.1560 | 0.2680 |
| 16 | 0.9  | 0.1456 | 0.1794 |
| 16 | 0.95 | 0.1715 | 0.2179 |
| 16 | 0.99 | 0.1791 | 0.2463 |
| 32 | 0.9  | 0.1083 | 0.1241 |
| 32 | 0.95 | 0.1375 | 0.1590 |
| 32 | 0.99 | 0.1549 | 0.1900 |

A positive number in Tables 2 and 3 implies that DST should be chosen. From the above table, we can deduce that for modes VER-1, VER-2, . . . VER-8, and HOR-6, HOR-7, when CG (in dB) is positive at all values of block size N and correlation coefficient ρ, DST should be chosen at all block sizes. According to an embodiment, DCT should be used when CG (in dB) is negative.

For the modes HOR-1, HOR-2, . . . HOR-5, from our experiments, we found that DST provides better compression efficiency than DCT when applied as the vertical transform for these modes. Thus, we propose to use DST as the vertical transform for all the Category 2 modes.

Note that in practice, for ease of hardware implementation, different versions of DCT and DST may be used in H.265/HEVC or any other video codec so as to reduce the number of multipliers, adders, shifters etc., as well as to support integer point arithmetic. In this situation, the DCT and DST matrices should be appropriately modified, and the above analysis may be straightforwardly applied to the new matrices.

By symmetry, a similar analysis may be performed for the choice of row (horizontal) transform: DCT or DST for the category 2 oblique modes, and DST may be used as the horizontal transform for all the Category 2 Oblique modes.

In DC mode, the predictor is the mean of pixels from the top-row and left-column. DCT is optimal along both the vertical and horizontal directions for the DC mode.

To summarize, there are currently thirty-four ('34') different unified "directional" prediction modes. The first three columns of the following Table 4 are taken from ITU-T JCTVC-B205_draft002, and the last column denotes how the prediction modes have been divided in Category 1 (prediction only from top row in the case of Intra-Vertical or only from left column in the case of Intra-Horizontal); Category 2 (prediction from both the top row and left columns); and the DC mode. The optimal transforms in each intra-prediction mode is a combination of DST and DCT. Note that while the angles for Angular Directional Prediction are shown in Table 3, i.e., from −8 to 8, a one-to-one mapping exists between these angles to the various modes to unified intra prediction as specified in ITU-T JCTVC-B205_draft002.

TABLE 4

Choice of DCT/DST as the horizontal and vertical transform for all the different category of intra prediction modes

| Intra-Prediction Mode | Intra-Prediction Type | Intra-Prediction Angle ID | Category of Oblique Mode | Row (Horizontal) Transform | Column (Vertical) Transform |
|---|---|---|---|---|---|
| 0 | Intra_Vertical | 0 | 1 | DCT | DST |
| 1 | Intra_Horizontal | 0 | 1: Prediction from Left Column | DCT | DST |
| 2 | Intra_DC | — | DC Mode | DCT | DCT |
| 3 | Intra_Vertical | −8 | 2 | DST | DST |
| 4 | Intra_Vertical | −4 | 2 | DST | DST |
| 5 | Intra_Vertical | +4 | 1 | DCT | DST |
| 6 | Intra_Vertical | +8 | 1 | DCT | DST |
| 7 | Intra_Horizontal | −4 | 2 | DST | DST |
| 8 | Intra_Horizontal | +4 | 1 | DST | DCT |
| 9 | Intra_Horizontal | +8 | 1 | DST | DCT |

TABLE 4-continued

Choice of DCT/DST as the horizontal and vertical
transform for all the different category of intra prediction modes

| Intra-Prediction Mode | Intra-Prediction Type | Intra-Prediction Angle ID | Category of Oblique Mode | Row (Horizontal) Transform | Column (Vertical) Transform |
|---|---|---|---|---|---|
| 10 | Intra_Vertical | −6 | 2 | DST | DST |
| 11 | Intra_Vertical | −2 | 2 | DST | DST |
| 12 | Intra_Vertical | +2 | 1 | DCT | DST |
| 13 | Intra_Vertical | +6 | 1 | DCT | DST |
| 14 | Intra_Horizontal | −6 | 2 | DST | DST |
| 15 | Intra_Horizontal | −2 | 2 | DST | DST |
| 16 | Intra_Horizontal | +2 | 1 | DST | DCT |
| 17 | Intra_Horizontal | +6 | 1 | DST | DCT |
| 18 | Intra_Vertical | −7 | 2 | DST | DST |
| 19 | Intra_Vertical | −5 | 2 | DST | DST |
| 20 | Intra_Vertical | −3 | 2 | DST | DST |
| 21 | Intra_Vertical | −1 | 2 | DST | DST |
| 22 | Intra_Vertical | +1 | 1 | DCT | DST |
| 23 | Intra_Vertical | +3 | 1 | DCT | DST |
| 24 | Intra_Vertical | +5 | 1 | DCT | DST |
| 25 | Intra_Vertical | +7 | 1 | DCT | DST |
| 26 | Intra_Horizontal | −7 | 2 | DST | DST |
| 27 | Intra_Horizontal | −5 | 2 | DST | DST |
| 28 | Intra_Horizontal | −3 | 2 | DST | DST |
| 29 | Intra_Horizontal | −1 | 2 | DST | DST |
| 30 | Intra_Horizontal | +1 | 1 | DST | DCT |
| 31 | Intra_Horizontal | +3 | 1 | DST | DCT |
| 32 | Intra_Horizontal | +5 | 1 | DST | DCT |
| 33 | Intra_Horizontal | +7 | 1 | DST | DCT |

In Table 4, the intra-prediction mode column (IntraPredMode) indicates the index that corresponds to a particular intra-prediction mode (e.g., as defined in ITU-T JCTVC-B205_draft002). The intra-prediction type column (IntraPredType) indicates whether the prediction mode is intra-vertical, intra-horizontal, or intra-DC. The intra-prediction angle identification (IntraPredAngleID) has a one-to-one mapping, as specified in "ITU-T JCTVC-B100_revision02", to the angle (dx/dy) and the direction of the intra-prediction. The category of the oblique mode indicates whether the intra-prediction mode belongs to Category 1 oblique modes, Category 2 oblique modes, or DC mode. The Row (Horizontal) Transform indicates the DCT/DST transform to be used in the Row Transform for the corresponding intra-prediction mode, and the Column (Vertical) transform indicates the DCT/DST transform to be used in the Column Transform for the corresponding intra-prediction mode.

Table 4 may be used by an encoder to determine whether to use a DST or DCT for each of the row (i.e., horizontal) transform and the column (i.e., vertical) transform. Table 4 is merely an example of a categorization of various intra-prediction modes according to the analyses described above, with regard to Category 1 and Category 2 oblique modes. According to other embodiments, a table with different DST/DCT mappings for each intra-prediction made may be used.

Figure 8:
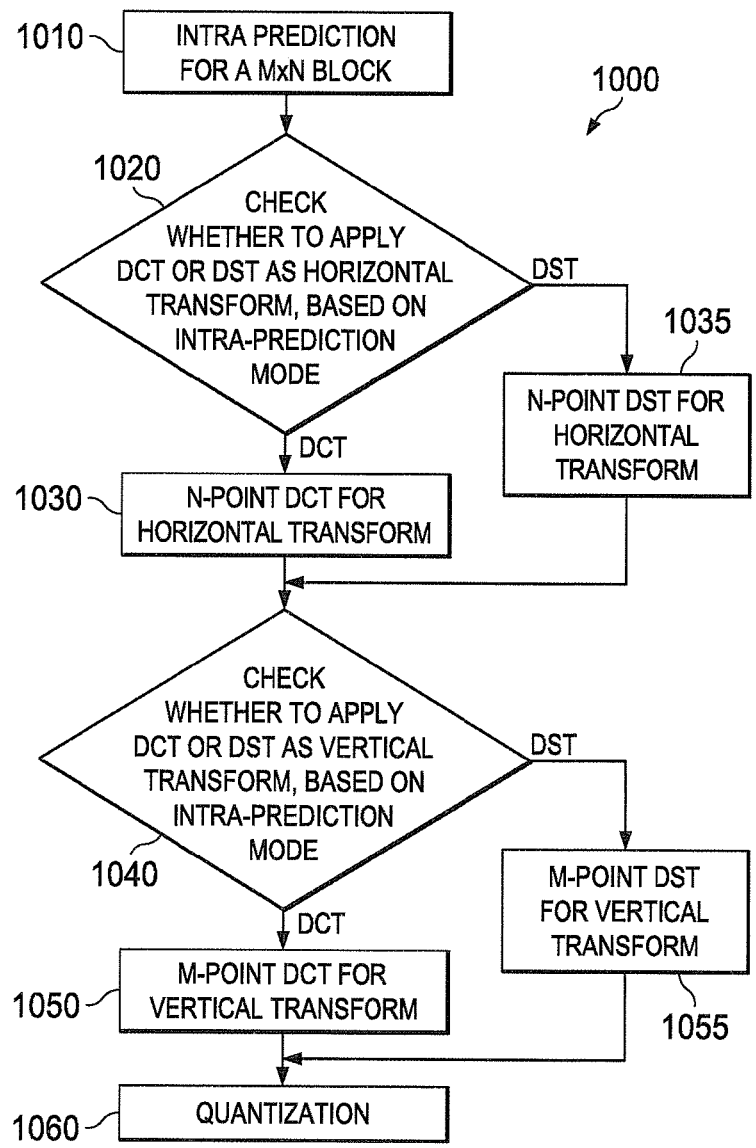
FIG. 8 illustrates a process for encoding a video bitstream using DCT/DST for intra-prediction according to an embodiment.

FIG. 8 illustrates a process for encoding a video bitstream using DCT/DST for intra-prediction according to an embodiment. According to an embodiment, process 1000 may be performed by encoder 100 of FIG. 1A. In block 1010, an M×N rectangular block is input (e.g. at the unified intra-prediction unit 111). According to an embodiment the M×N rectangular block (also referred to as X) may be input as an M×N input matrix. The intra-prediction unit 111 performs intra-prediction on X in block 1010 and outputs an intra-prediction residue E and an intra-prediction mode index. According to an embodiment, the unified intra-prediction unit 111 first determines an intra-prediction mode based on X (e.g. by using technique disclosed in ITU-T JCTVC-B100_revision02). Based on the intra-prediction mode, the unified intra-prediction unit 111 calculates the prediction for X to determine $\tilde{X}$. Then the intra-prediction residue E may be calculated according to Equation 7.

In block 1020, the encoder determines whether to apply DCT or DST as the horizontal transform. According to an embodiment, block 1020 may be performed by the transform unit 120. That is, in block 1020, the encoder may look up the corresponding horizontal transform according to Table 4 based on the intra-prediction mode determined in block 1010. Alternatively, the encoder may determine the horizontal transform based on the analysis discussed earlier (i.e. by calculating the relative coding gain CG).

If the DCT is determined for the horizontal transform, the transform unit 120 takes the horizontal transform for each of the M rows using the DCT in block 1030. That is, in block 1030, the DCT is applied by multiplying the intra-prediction residue E with the N×N DCT matrix (C) to determine the output of the horizontal transform $E_1$ according to Equation 32:

$$E_1 = EC \qquad \text{[Eqn. 32]}$$

In contrast, if the DST is determined for the horizontal transform, the transform unit 120 takes the horizontal transform for each of the M rows using the DST in block 1035. That is, in block 1035, the DST is applied by multiplying the intra-prediction residue E with the N×N DST matrix (S) to determine $E_1$ according to Equation 33:

$$E_1 = ES \qquad \text{[Eqn. 33]}$$

In block 1040, the encoder determines whether to apply DCT or DST as the vertical transform. According to an embodiment, block 1040 may be performed by the transform unit 120. That is, in block 1040, the encoder may look up the corresponding vertical transform according to Table 4 based on the intra-prediction mode determined in block 1010. Alternatively, the encoder may determine the vertical transform based on the analysis discussed earlier (i.e. by calculating the relative coding gain CG).

If the DCT is determined for the vertical transform, the transform unit 120 takes the vertical transform for each of the N columns using the DCT in block 1050. That is, in block 1050, the DCT is applied to $E_1$ by multiplying the transpose of the M×M DCT matrix ($C^T$) to $E_1$ to determine the transform coefficients $E_2$ after performing both the horizontal and vertical transforms according to Equation 34:

$$E_2 = C^T E_1 \quad \text{[Eqn. 34]}$$

In contrast, if the DST is determined for the vertical transform, the transform unit 120 takes the vertical transform for each of the N columns using the DST in block 1055. That is, in block 1055, the DST is applied to $E_1$ by multiplying the transpose of the M×M DST matrix ($S^T$) to $E_1$ to determine $E_2$ according to Equation 35:

$$E_2 = S^T E_1 \quad \text{[Eqn. 35]}$$

$E_2$ is then quantized in block 1060 by the quantizer 122 to output a quantized transform coefficient block $E_3$. According to an embodiment, the quantization operation is non-linear. E, $E_1$, $E_2$, and $E_3$ are all M×N matrices.

For each element in an M×N quantized transform coefficient block $E_3$, an index is generated which is then passed through various modules in the video pipeline, and sent in the video bit-stream.

In another embodiment, the vertical transform may be performed prior to the horizontal transform, such that blocks 1040-1055 are performed prior to blocks 1020-1035.

Figure 9:
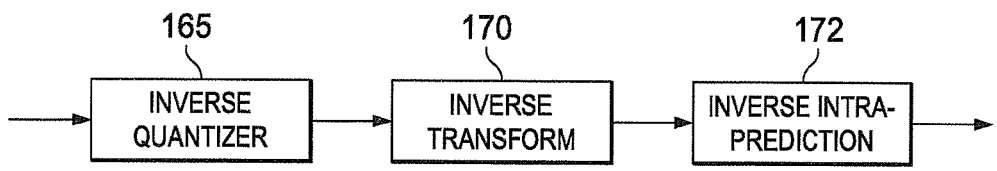
FIG. 9 is a block diagram of a portion of a video decoder according to an embodiment of the present disclosure.

FIG. 9 is a block diagram of a portion of a video decoder according to an embodiment of the present disclosure. The inverse quantizer 165. The inverse quantizer 165 maps the indices received in the bit-stream to quantized transform coefficient values $E_3$ (These values are exactly the same which were the output of forward quantization module).

Following the inverse quantization, an inverse transform unit 170 applies an inverse transform (e.g. DCT/DST) in both the horizontal and vertical directions according to determined intra-prediction mode. This intra-prediction mode is also available in the video bit-stream, and as an input to the inverse transform unit. The inverse transform (along horizontal and vertical directions) can either be the conventional inverse DCT or proposed inverse DST, depending on the intra-prediction mode. The inverse transform is followed by intra prediction unit 172 and reconstructs the intra blocks in by performing inverse intra-prediction according to the intra-prediction mode.

Figure 10:
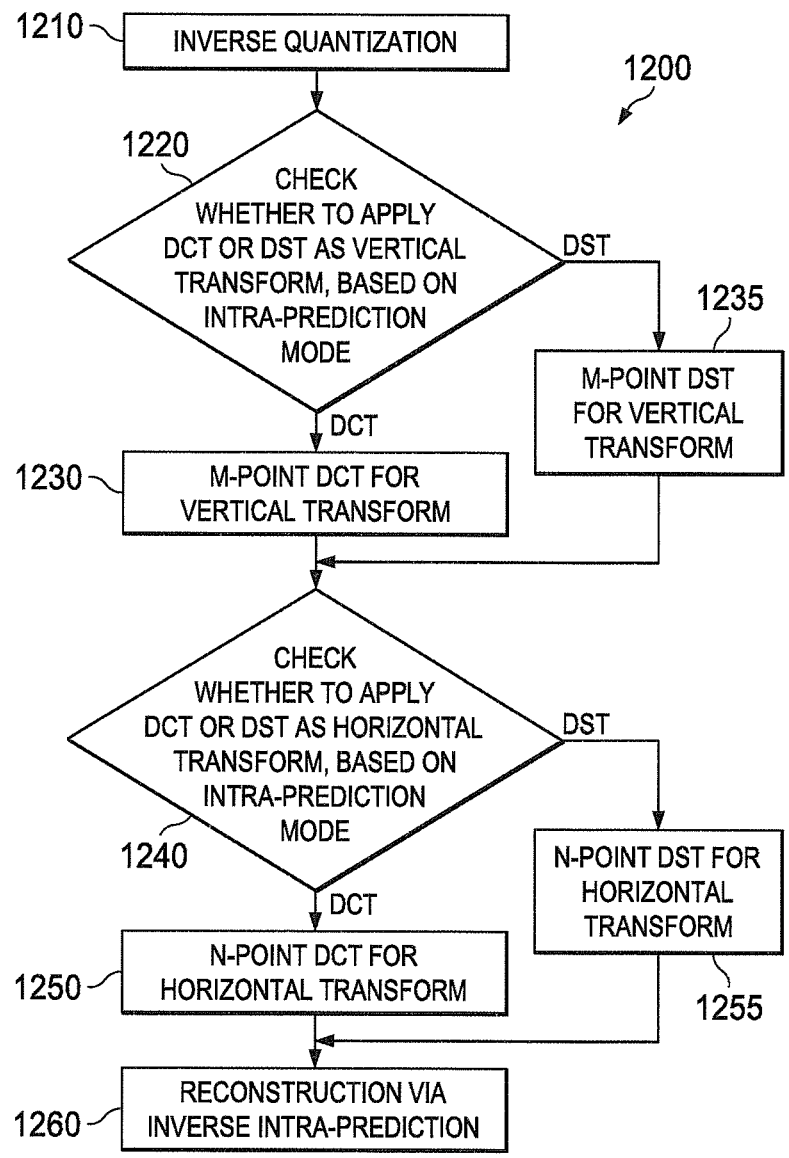
FIG. 10 illustrates a process for decoding a video bitstream using DCT/DST according to an embodiment.

FIG. 10 illustrates a process for decoding a video bitstream using DCT/DST according to an embodiment. According to an embodiment, process 1200 may be performed by decoder 150 of FIG. 1B. For illustrative purposes, process 1200 will be described as decoding the output data of process 1100. In block 1210, the decoder receives the indices corresponding to the elements of the quantized transformed coefficient matrix and performs inverse quantization to output the quantized transformed coefficient matrix. For example, the inverse quantizer 165 receives the indices in the bit-stream for quantized transformed coefficients and performs inverse quantization to output transformed coefficient matrix $E_3$.

In block 1220, the decoder determines whether to apply DCT or DST as the inverse vertical transform. According to an embodiment, block 1220 may be performed by the inverse transform unit 170. In block 1220, the decoder may look up the corresponding vertical transform according to Table 4 based on the intra-prediction mode.

If the DCT is determined for the vertical transform, the inverse transform unit 170 takes the inverse vertical transform for each of the N columns using the DCT in block 1230. For example, in block: 1230, the inverse DCT is applied by multiplying an M×M inverse DCT matrix with the transformed residue matrix $E_4$ according to Equation 36:

$$E_4 = C \cdot E_3 \quad \text{[Eqn. 36]}$$

where $E_4$ denotes a horizontal transformed residue matrix, and C denotes an M×M inverse DCT matrix.

In contrast, if the DST is determined for the vertical transform, the inverse transform unit 170 takes the inverse vertical transform for each of the N columns using the DST in block 1235. For example, in block 1235, the inverse DST is applied by multiplying an M×M inverse DST matrix (S) with the transformed residue matrix $E_4$ according to Equation 37:

$$E_4 = S E_3 \quad \text{[Eqn. 37]}$$

In block 1240, the decoder determines whether to apply DCT or DST as the inverse horizontal transform. According to an embodiment, block 1240 may be performed by the inverse transform unit 1220. In block 1240, the decoder may look up the corresponding horizontal transform according to Table 4 based on the intra-prediction mode determined in block 1210.

If the DCT is determined for the horizontal transform, the inverse transform unit 170 takes the inverse horizontal transform for each of the M rows using the DCT in block 1250. For example, in block 1250, the inverse DCT is applied by multiplying the horizontal transformed residue matrix $E_4$ with the transpose of an N×N inverse DCT matrix according to Equation 38:

$$E_5 = E_4 C^T \quad \text{[Eqn. 38]}$$

where $E_5$ denotes an approximation of the error prediction residual E, and $C^T$ denotes the transpose of an N×N inverse DCT matrix.

In contrast, if the DST is determined for the horizontal transform, the inverse transform unit 170 takes the inverse horizontal transform for each of the M rows using the DST in block 1255. For example, in block 1255, the inverse DST is applied by multiplying the horizontal transformed residue matrix with the transpose of the N×N inverse DST matrix (S) according to Equation 39:

$$E_5 = E_4 S^T \quad \text{[Eqn. 39]}$$

In block 1260, the decoder reconstructs the image based on the approximation of the error prediction residual and the intra-prediction mode. For example, in block 1260, the reconstruction unit 1130 performs inverse intra-prediction on $E_6$ (i.e. the approximation of the error prediction residual E) and the intra-prediction mode to reconstruct the M×N image block X.

In another embodiment, the inverse horizontal transform may be performed prior to the inverse vertical transform, such that blocks 1240-1255 are performed prior to blocks 1220-1235.

Figure 11:
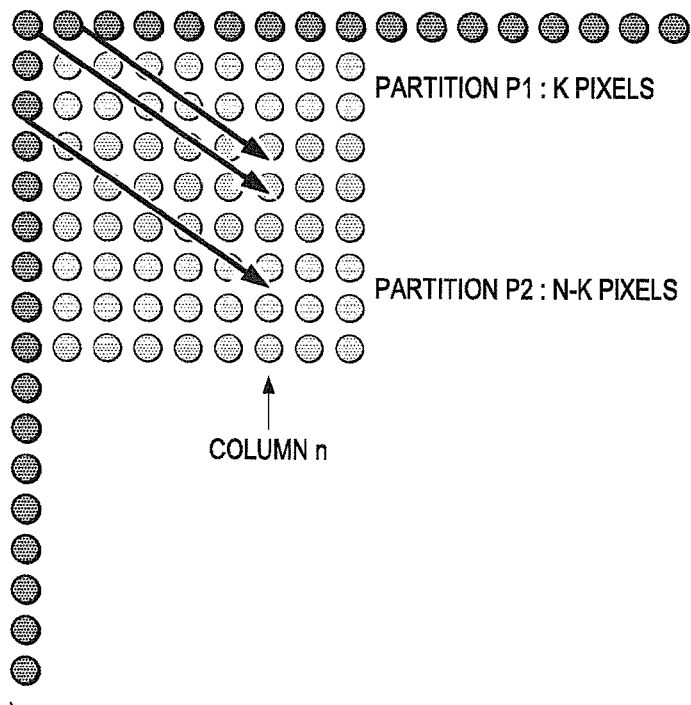
FIG. 11 is a diagram illustrating prediction of pixels using Category 2 oblique modes by partitioning the columns into two regions according to an embodiment of the present disclosure.

FIG. 11 is a diagram illustrating prediction of pixels using Category 2 oblique modes by partitioning the columns into two regions according to an embodiment of the present disclosure. Here the prediction is performed from both the left column and the top row of pixels. As presented earlier in the analysis of determining a transform DCT or DST for a Category 2 oblique mode, to calculate the prediction residue matrix E, and the autocorrelation matrix for a column j (respectively row i) of the matrix E, the resulting autocorrelation matrix for column j (respective row i) does not have a nice structure as the ones for Category 1 oblique modes. Furthermore, the autocorrelation matrix is dependent on column 'j' implying a different KLT for each column. While it is possible to compute a separate KLT for each of the N columns of the prediction residue E matrix, the computational complexity for N different transforms per direction is much higher than simply using 1 transform such as DCT or DST.

In order to achieve a low complexity transform coding scheme possibly with DST and DCT transforms, the following approach may be applied:

Consider column 'n', where $1 \leq n \leq N$, to be divided into two partitions: P1 and P2 as shown in FIG. 11. Let the number of pixels in P1 be K, where $0 \leq K \leq N$. All the pixels in the top partition P1 are predicted from the top row of pixels while those in partition P2 are predicted from the left column.

The columns are partitioned into two regions depending on the prediction direction. Pixels in the top partition (i.e. P1) are predicted from the top row while those in the bottom partition are predicted from the left column.

For the pixels in partition P1, a similar analysis may be performed as was done for Category 1 Oblique modes, where the prediction was from the top row and the vertical transform was evaluated. Based on this analysis, it is determined that for the pixels in Partition P1, the DST will be the optimal transform. For Partition P2, the prediction is performed from the left column, i.e., along the horizontal direction. Hence, we can simply take DCT as the transform for these pixels in partition P2.

Note that the above approach leads to simpler transforms: DST and DCT. But here, a K-point DST will need to be performed for partition P1 pixels and (N–K) point P2 pixels. Also the number of pixels K in partition P1 will vary across the columns and this will require different size DST's and DCT's in a single image block. This implies that even though the transforms are simpler: either DST or DCT, the transform length varies across the columns and a costly implementation with multiple different-sized DST's and DCT's will be required for an image block. To avoid such a costly implementation, the following sub-optimal scheme which still improves over the prior art may be used, according to an embodiment of the present disclosure. If the majority of pixels in a column belong to partition P1, i.e., $$K \geq \frac{N}{2},$$

the DST will be used for the whole column; otherwise, the DCT will be used. The rationale behind this above approach is that the prediction error residue will be mimicked by a sine when majority of pixels lie in partition P1, and similarly prediction error residue is mimicked by cosine when majority of the pixels lie in partition P2.

A similar analysis may be applied for all the rows in this image block to adaptively choose between the DST and DCT depending on whether the majority of pixels are predicted from the left column or top row. This is illustrated in FIG. 12.

Figure 12:
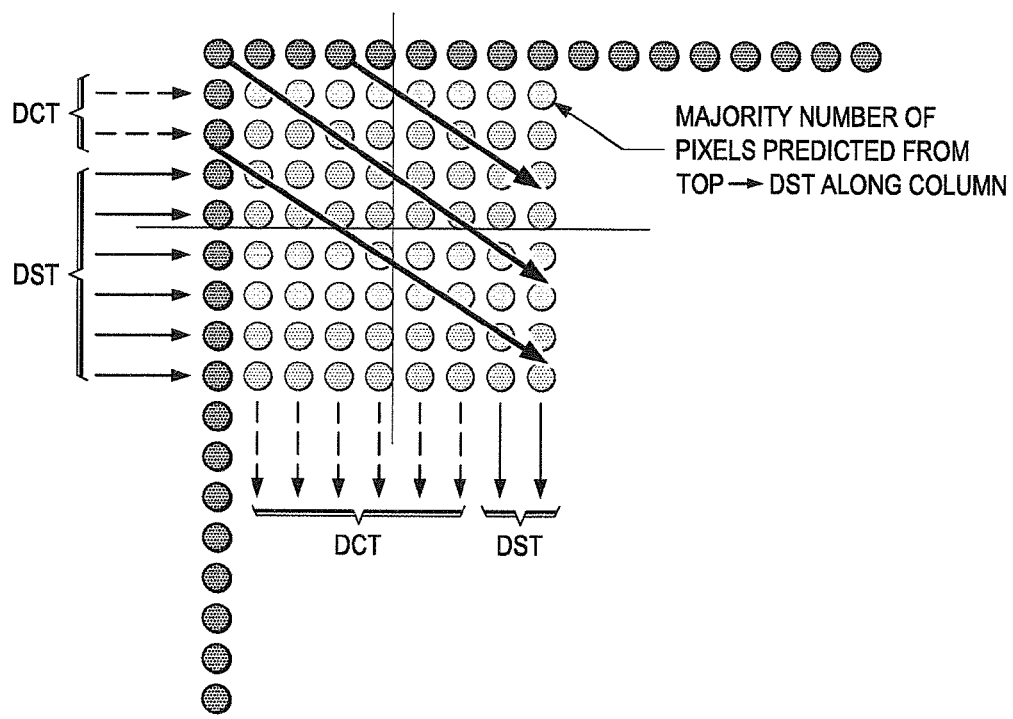
FIG. 12 is a diagram illustrating the derivation of transforms for Category 2 oblique modes when the columns are partitioned into two regions according to an embodiment of the present disclosure.
Figure 13:
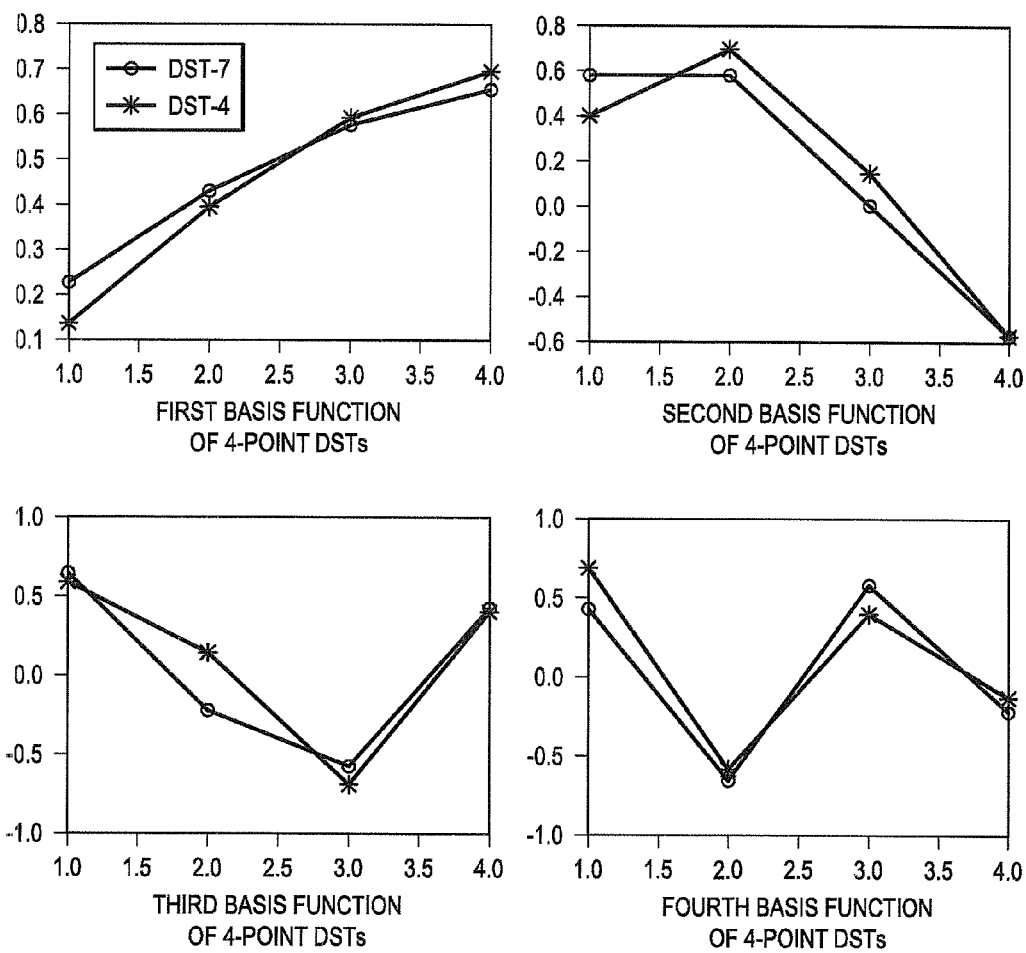
FIG. 13 illustrates charts of basis functions for DST Type-4 and DST Type-7 for 4-point DSTs according to an embodiment of the present disclosure.
Figure 14:
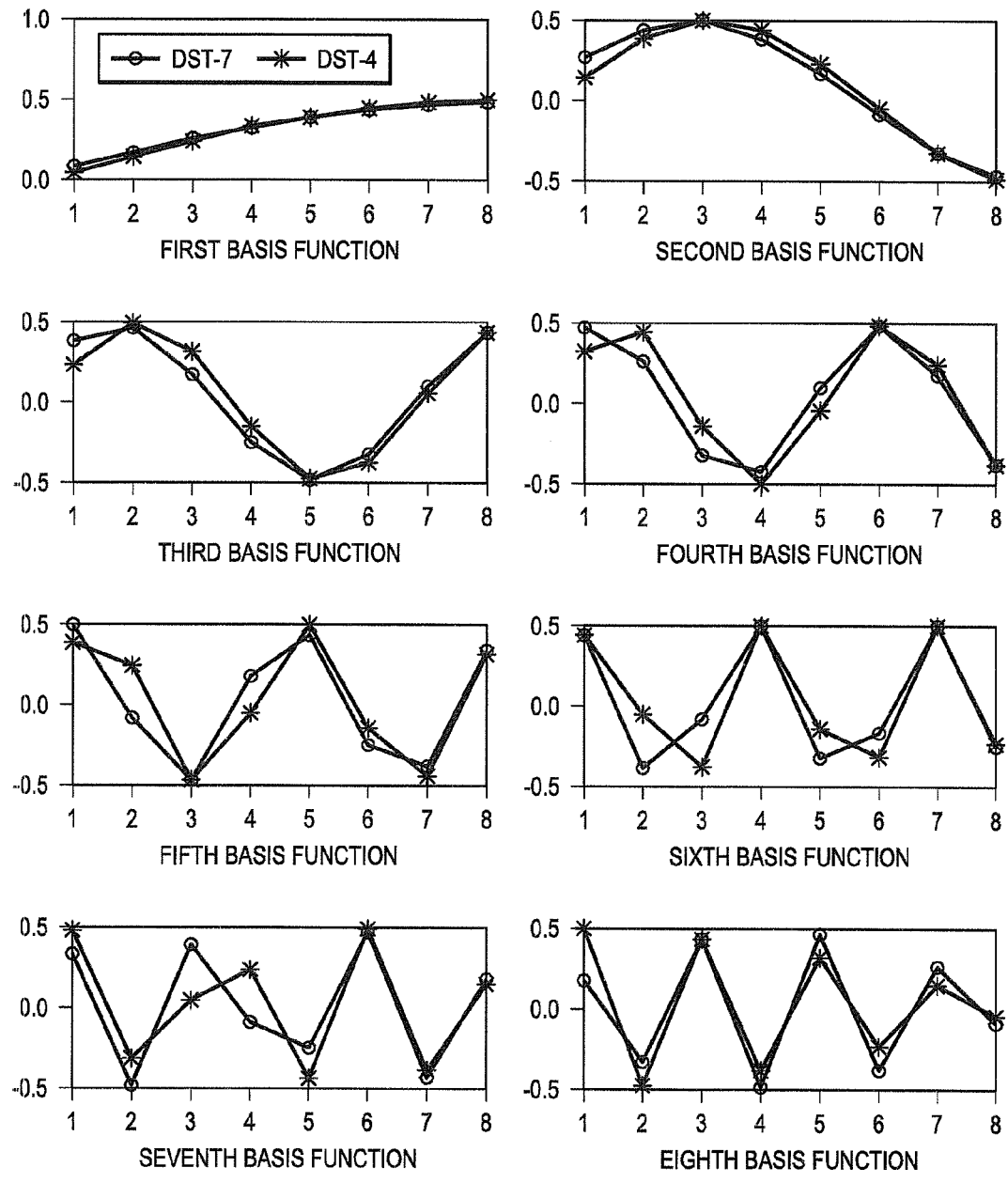
FIG. 14 illustrates charts of basis functions for DST Type-4 and DST Type-7 for 8-point DSTs according to an embodiment of the present disclosure.

FIG. 12 is a diagram illustrating the derivation of transforms for Category 2 oblique modes when the columns are partitioned into two regions according to an embodiment of the present disclosure. According to an embodiment, DCT/DST is applied adaptively across various columns and rows in a Category 2 oblique mode. Mathematically if $T_s$ and $T_c$ denote the DST and DCT, we can write the overall transform operation as follows:

$$Y = T_C^T \begin{bmatrix} X_{11} & 0 \\ 0 & 0 \end{bmatrix} T_C + T_C^T \begin{bmatrix} 0 & 0 \\ X_{21} & 0 \end{bmatrix} T_S + \quad [\text{Eqn. 40}]$$

$$T_S^T \begin{bmatrix} 0 & X_{12} \\ 0 & 0 \end{bmatrix} T_C + T_S^T \begin{bmatrix} 0 & 0 \\ 0 & X_{22} \end{bmatrix} T_S$$

where $X = \begin{bmatrix} X_{11} & X_{12} \\ X_{21} & X_{22} \end{bmatrix}$ are the four partitions of the image block, e.g., in FIG. 12, for a 8×8 block size, $X_{11}$ is the top-left 2×6 region where DCT is applied as both the horizontal and vertical transform; $X_{12}$ is the top-right 2×2 region; $X_{21}$ is the bottom-left 6×6 region; and $X_{22}$ is the bottom-right 6×2 region.

Note that Equation 40 does not imply the application of four transforms. In the actual implementation, we may simply apply a single, separable transform. The idea is to find the partitions $x_{11}$, $x_{12}$, $x_{21}$ and $x_{21}$ and $x_{22}$ based on the intra-prediction mode. The vertical transform $T_c$ may then be applied on the left partition, i.e., $$X_{Left} = \begin{bmatrix} X_{11} \\ X_{21} \end{bmatrix},$$

and $T_s$ may be applied on the right partition, i.e., to $$X_{Right} = \begin{bmatrix} X_{12} \\ X_{22} \end{bmatrix}.$$

Similarly when we take the horizontal transform, we can apply $T_c$ on the top partition, i.e. $X_{Top} = [X_{11} \, X_{12}]$, and $T_s$ may be applied to the bottom partition, i.e. $X_{Bottom} = [X_{21} \, X_{22}]$.

According to an embodiment, to incorporate the role of quantization scaling matrices, DST matrices need to be modified appropriately in the implementation. Specifically, if S and C denote the original DST and DCT matrices at a block size (e.g. block size N×N, where N can be 4, 8, 16, 32 in video coding or any positive integer greater than 0, in general), B denotes the quantization scaling matrix, and C'=B·C denotes the DCT implementation in the video codec, then the modified DST matrix that should be used in implementation is given by S'=B·S=C'·inv(C)·S, where '·' denotes standard matrix multiplication. The inverse DST matrices can be obtained in an analogous manner using inverse DCT matrices.

As an example, we next provide the modified 4×4 and 8×8 DST matrices that can be used for implementing DST Type-7 for the DCT in H.264/AVC standard when shifted by 7 bits:

Forward 4×4 DST Transform is given by Equation 41:

$$S = \begin{bmatrix} 29 & 117 & 84 & 87 \\ 55 & 117 & -29 & -133 \\ 74 & 0 & -74 & 117 \\ 84 & -117 & 55 & -46 \end{bmatrix} \quad [\text{Eqn. 41}]$$

Inverse 4×4 DST Transform is given by Equation 42:

$$invS = \begin{bmatrix} 29 & 58 & 84 & 43 \\ 55 & 58 & -29 & -66 \\ 74 & 0 & -74 & 58 \\ 84 & -58 & 55 & -23 \end{bmatrix} \quad [\text{Eqn. 42}]$$

8×8 DST Transform is given by Equation 43:

$$\begin{bmatrix} 32, & 98, & 111, & 180, & 175, & 167, & 94, & 68 \\ 63, & 167, & 134, & 98, & -32, & -149, & -139, & -126 \\ 92, & 186, & 50, & -126, & -169, & -34, & 111, & 167 \\ 118, & 149, & -73, & -167, & 63, & 180, & -26, & -186 \\ 140, & 68, & -139, & 34, & 157, & -126, & -73, & 180 \\ 157, & -34, & -94, & 186, & -92, & -68, & 134, & -149 \\ 169, & -126, & 26, & 68, & -140, & 186, & -125, & 98 \\ 175, & -180, & 125, & -149, & 118, & -98, & 50, & -34 \end{bmatrix} \quad [\text{Eqn. 43}]$$

According to another embodiment, DST type-4 can be used instead of DST type-7 as a transform in the above DCT/DST transform scheme for intra prediction modes. The advantages of using DST-Type 4 as a low complexity alternate to the optimal DST-Type 7 in DCT/DST scheme are as follows:

1. DST Type-4 can re-use (a) the same quantization tables and (:i)) the same transform cores as DCT-Type 2 in H.264/AVC, which is generally used in video coding as the transform to code the prediction residues. Re-using the same quantization and inverse quantization tables, as well as transform components, would reduce the implementation cost.

2. By using the same transform kernel core, DST component of mode-dependent DCT/DST will also not require matrix multiplication and the same fast butterfly kind of algorithms as those for the standard DCT-Type 2 can be used. This would reduce the encoding/decoding time.

3. The basis functions for DST Type-4 and DST Type-7 are plotted in FIGS. 13-14 at sizes 4 and 8, respectively. As can be seen, the basis functions of DST Type-4 and DST Type-7 are almost similar, so a DST-Type 4 can be used as a low complexity alternate to DST-Type 7, which is the optimal transform in mode-dependent DCT/DST. Therefore, there will be negligible performance loss from using DST Type-4 instead of DST Type-7.

4. A similar observation holds for sizes 16, 32 and higher. Because DST Type-4 at size N×N can be derived from DCT at size 2N×2N, the DST Type-4 in mode-dependent DCT/DST can be used for sizes up to 16×16 using the 32×32 DCT in the ongoing HEVC standardization. This will reduce the implementation cost.

According to an embodiment, integer DST Type-4 matrices may be used. To reduce encode/decode time, butterfly transform structures are generally used instead of full matrix multiplication. Also for the implementation, transform coefficients are converted to integers rather than floating point numbers. However, if a full matrix multiplication implementation is desired for DST Type-4 matrices, the DST Type-4 matrix must first be scaled, and then floating-point matrix entries must be rounded to integers. According to the embodiment, specific matrices may be used for this purpose.

In general, orthogonality of the resulting integer DST matrix denoted as D is a highly desirable property because quantization distortion can then be estimated in the transform domain. Furthermore, the implementation cost is reduced as the inverse of D is its transpose. Note that when the resulting integer transform is not perfectly orthogonal, there is distortion even without transform-coefficient quantization. This is a shortcoming for high-bitrate coding and especially for lossless coding. This can be illustrated as follows: specifically, for input matrix let $Y=D^T \cdot X \cdot D$ denote the transform coefficients and let $Z=D \cdot Y \cdot D^T = D \cdot D^T \cdot X \cdot D \cdot D^T$ represent the source reconstruction for a 2-d separable transform (we assume no quantization here, and the $[\ ]^T$ notation denotes the matrix transpose operation). Then, if the integer transform D is not perfectly orthogonal, there can be distortion (difference) in X and 2, as $D \cdot D^T$ will not be an identity matrix.

We next propose the derivation for orthogonal integer version of DST Type-4:

The floating-point DST Type-4 matrix at size 4×4 is given by Equation 44:

$$S_4 = \text{SineMatrix\_Type4} \quad [\text{Eqn. 44}]$$

$$= \begin{bmatrix} 0.1379 & 0.3928 & 0.5879 & 0.6935 \\ 0.3928 & 0.6935 & 0.1379 & -0.5879 \\ 0.5879 & 0.1379 & -0.6935 & 0.3928 \\ 0.6935 & -0.5879 & 0.3928 & -0.1379 \end{bmatrix}$$

An integer based approximation of DST Type-4 matrix can be obtained as follows in Equation 45:

$$S_4\_\text{Int}\_1 = \text{round}(S_4 * 14.5)/\text{sqrt}(221) \quad [\text{Eqn. 45}]$$

$$= 1/\text{sqrt}(221) * \begin{bmatrix} 2 & 6 & 9 & 10 \\ 6 & 10 & 2 & -9 \\ 9 & 2 & -10 & 6 \\ 10 & -9 & 6 & -2 \end{bmatrix}$$

In the above Equation 45, 1/sqrt (221) is the normalization factor and can be absorbed in the scaling and quantization matrices if full matrix multiplication is desired for the DST Type-4.

Similarly at a slightly higher precision, the following DST Type-4 matrix can be used:

$$S_4\_\text{Int}\_2 = \text{round}(S_4 * 21.0)/\text{sqrt}(442) \quad [\text{Eqn. 46}]$$

$$= 1/\text{sqrt}(442) * \begin{bmatrix} 3 & 8 & 12 & 15 \\ 8 & 15 & 3 & -12 \\ 12 & 3 & -15 & 8 \\ 15 & -12 & 8 & -3 \end{bmatrix}$$

Again, 1/sqrt(442) is the normalization factor and can be absorbed in the scaling and quantization matrices, if full matrix multiplication is desired for the DST Type-4 implementation.

The above derived integer versions of DST Type-4 matrices: $S4\_{Int}\_1$ and $S4\_\text{Int}\_2$ in Equations 45-46 are perfectly orthogonal, i.e., $S4\_\text{Int}\_1^T \times S4\_\text{Int}\_1 = I$; $S4\_\text{Int}\_2^T \times S4\_\text{Int}\_2 = I$, where I is the 4×4 Identity matrix. Hence, there will be no distortion in a lossless codec due to transform operations.

To overcome the shortcoming of full matrix multiplication for appropriately scaled DST Type 7 (in order to retain the same set of quantization and inverse quantization matrices), next we propose to (a) use a fast implementation for "appropriately scaled" DST Type-7 at size 4×4. The advantages of fast implementation for DST Type-7 are that it takes fewer multiplications as compared to sixteen multiplications in a full matrix multiplication of DST at size 4×4 with a size '4' input vector. Our proposed Forward DST takes nine multiplications while inverse DST uses eight multiplications. This would reduce the implementation cost in hardware where multipliers are expensive, and adders and shifters are relatively cheap. The total percentage reduction for the forward and inverse DST implementation from original to proposed implementations is respectively (16−8)/16*100=50%, and (16−9)/16*100=43.75%.

Fast Forward 4*4 DST Type 7 Matrix: The 4×4 DST Type-7 matrix after proper scaling to incorporate the scaling matrices in quantization matrices for H.264/AVC DCT is given in Equation 41. Full matrix multiplication will require sixteen multiplications, and twelve adds. To reduce the number of multiplications required, the above logic for the matrix multiplication can be implemented via the following operations in Equation 47:

$c[0]=block[0]+block[3]$;

$c[1]=block[1]+block[3]$;

$c[2]=74*block[2]$;

$tmp[0]=29*c[0]+55*c[1]+c[2]$;

$tmp[1]=117*block[0]+block[1]-block[3])$;

$tmp[2]=84*c[0]-29*c[1]-c[2]$;

$tmp[3]=87*c[0]-133*c[1]+117*block[2]$;  [Eqn. 47]

where block[0] . . . block[3] denote the input vector of dimension 4×1, and c[0], c[1], and c[2] are intermediate variables, while tmp[0] . . . tmp[3] are the output vectors of dimension 4×1. By carrying out the operations as above, it only requires nine multiplications and ten additions, instead of sixteen multiplications and twelve additions described earlier.

The percentage savings in multiplications and additions is (16−8)/16*100=50%, and (12−19)/12*100=16.67%.

Fast Inverse DST Type-7: To carry out the operations of 4×4 inverse DST in Equation 42 via matrix multiplication, sixteen multiplications and twelve adds are required. To reduce the number of multiplications required, the above logic for the matrix multiplication can be implemented via the following operations in Equation 48:

$c[0]=block[0]+block[2]$;

$c[1]=58*block[1]$;

$c[2]=block[2]+block[3]$;

$tmp[0]=29*c[0]+c[1]+55*c[2]-((block[3]<<3)+(block[3]<<2))$;

$tmp[1]=55*c[0]+c[1]-84*c[2]+(block[3]<<4)+(block[3]<<1)$;

$tmp[2]=74*(block[0]-block[2])+58*block[3]$;

$tmp[3]=84*c[0]-c[1]-29*c[2]+(block[3]<<2)+(block[3]<<1)$;  [Eqn. 48]

where block[0] . . . block[3] denote the input vector of dimension 4×1 (in the context of video coding, this is the input just before inverse transform). c[0], c[1] and c[2] are intermediate variables, while tmp[0] . . . tmp[3] is the output vector of dimension 4×1. By carrying out the operations as above, it requires no more than eight multiplications, sixteen additions, and six shifts. The percentage savings in multiplications is (16−8)/16*100=50%. The adder cost increases by (16−12)/12*100=33.33%. However, because adders have much lower hardware implementation cost than multipliers, the total implementation cost for the proposed inverse transform is still lower.

A different implementation of the inverse transform in Equation 42 is given below in Equation 49:

$c[0]=block[0]+block[2]$;

$c[1]=58*block[1]$;

$c[2]=block[2]+block[3]$;

$c[3]=12*block[3]$;

$tmp[0]=29*c[0]+c[1]+55*c[2]-c[3]$;

$tmp[1]=55*c[0]+c[1]-84*c[2]+c[3]+(c[3]>>1)$;

$tmp[2]=74*(block[0]-block[2])+58*block[3]$;

$tmp[3]=84*c[0]-c[1]-29*c[2]+(c[3]>>1)$;  [Eqn. 49]

where block[0] . . . block[3] denote the input vector of dimension 4×1, c[0], c[1], and c[2] are intermediate variables, while tmp[0] . . . tmp[3] are the output vectors of dimension 4×1.

Here the percentage savings in multiplications is (16−10)/16*100=37.5%. The adder cost increases by (14−12)/12*100=16.67%. Additionally there are two shifts. However, because adders and shifters have much lower hardware implementation cost than multipliers, the total implementation cost for the proposed inverse transform is still lower.

Some additional points to note are: 1) we have not changed the values in DST matrices which are obtained after rounding, and incorporating scaling due to quantization matrices. If the entries in the DST matrices are changed, different fast implementations can similarly be derived; 2) also note that if the entries in the DST matrices are changed, ideally the norm of a basis vector should not be changed. Specifically, if some entries in a basis vector are increased, then the other entries should be decreased. If all the entries are increased, then this can lead to transform instability; 3) the matrices in the DST forward and inverse matrices are not perfectly orthogonal, because of non-linear operation of rounding. When a perfectly orthogonal matrix is found, the procedure of finding fast transforms would be similar to reduce the multipliers, and such; 4) the last sub-equation of Equation 49 can also be written as:

$tmp[3]=(84*c[0]-c[1]-29*c[2]+(c[3]<<1)+rnd\_factor)>>shift\_bits$;  [Eqn. 50]

where shift_bits is the number of bits shifted for transform matrix, and rnd_factor is a rounding factor=$(1/2)*2^{(shift\_bits)}$, as is mostly done in video coding.

Next, we present a low-complexity implementation of DST Type-7 matrix in Equation 13. The DST matrix at size '4' after a 7-bit shift and rounding is given in below in Equation 51:

$$S_{7,round} = \text{round}\left(128 * \frac{2}{\sqrt{2N+1}}\sin\frac{(2i-1)j\pi}{2N+1}\right)$$ [Eqn. 51]

-continued $$= \begin{bmatrix} 29 & 55 & 74 & 84 \\ 74 & 74 & 0 & -74 \\ 84 & -29 & -74 & 55 \\ 55 & -84 & 74 & -29 \end{bmatrix}$$

where the basis vectors are along rows. To reduce the number of multiplications required from sixteen for full matrix multiplication, we make the following changes to the elements of the DST matrix: Change '29' to '28', and '55' to '56'. i.e., $$S_{7,round,approx} = \begin{bmatrix} 28 & 56 & 74 & 84 \\ 74 & 74 & 0 & -74 \\ 84 & -28 & -74 & 56 \\ 56 & -84 & 74 & -28 \end{bmatrix} \quad [\text{Eqn. 52}]$$

where we change '29' to '28', and '56' to '55', because '28', '56', and '84' have the same Highest Common Factor (HCF) as '28' itself, and we can thus use the structure of the above DST matrix: for the following fast implementation. In essence, at least one of a plurality of elements in a DST Type-7 matrix is adjusted such that the plurality of elements share a common factor In our example, we call the resulting approximate DST matrix with elements '28' and '56' as "(28, 56) DST" while we term the original DST matrix as "(29,55) DST". Note that in actual implementation, changing the numbers '29' to '28' and '55' to '56', has negligible compression performance impact on the video coding. But with these changes, we can have a fast implementation for DST with only five multiplications, as presented below, instead of sixteen in full matrix multiplication.

Also, note that '28' is a multiple of '4' and '56' is a multiple of '8'. So the least two and three significant bits in '28' and '56' are respectively '0', and in a hardware implementation, multiplication by '28' and '56' would be easier, as compared to '29', which is a prime number, and '55', which has factors of '5' and '11', both of which are prime numbers.

Specifically the 4-point fast forward (28,56) DST transform in Equation 52 for the input $[x_0\ x_1, x_2\ x_3]^T$ and output $[y_0, y_1, y_2, y_3]^T = S_{7,round,approx} \cdot [x_0\ x_1, x_2\ x_3]^T$ can be implemented via the following logic in Equation 53:

$c_0 = x_0 + x_3$ $c_1 = x_1 + x_3$ $c_2 = x_0 - x_1$ $c_3 = 74 * x_2$ $y_0 = ((28*(c_0+(c_1<<1))+c_3)+\text{rnd\_factor})>>\text{shift\_bits}$ $y_1 = ((74*(x_0+x_1-x_3)+\text{rnd\_factor})>>\text{shift\_bits}$ $y_2 = ((28*(c_2+(c_0<<1))-c_3)+\text{rnd\_factor})>>\text{shift\_bits}$ $y_3 = ((28*((c_2<<1)-c_1)+c_3)+\text{rnd\_factor})>>\text{shift\_bits}$ [Eqn. 53]

where $c_0$, $c_1$, $c_2$, and $c_3$ are intermediate values, '<<k' and '>>k' mean left and right shift by k bits respectively, shift_bits=7 bits, and rnd_factor=(1<<shift_bits)>>1=64.

Note that the addition of rnd_factor and shifting by shift_bits is a practical necessity in video compression, and in general is performed to all the transform operations, where the transform matrices are initially shifted during the rounding operation (in the above case, we had shifted by 7 bits, and this variable shift_bits can be any positive integer K (e.g., K=1, 2, or 10 etc.) depending on the implementation, where the output is down shifted by K bits).

The above fast matrix implementation has only five multiplications, eleven additions, and three right shifts (ignoring the addition of rnd_factor, and right-shift by shift_bits). Each left shift is by one bit only, and is cheap in hardware. Note that we have ignored the number of additions, shifts associated with rnd_factor, and shift_bits, which would also be present in full matrix multiplication implementation for DST $S_{7,round}$ as well.

The 4-point fast inverse DST transform for (28,56) DST for the input $[y_0\ y_1, y_2\ y_3]^T$ and output $[x_0, x_1, x_2, x_3]^T = (S_{7,round,approx})\text{T.}\ [x_0\ x_1, x_2\ x_3]^T$, is given in Equation 54:

$c_0 = y_0 + y_2$ $c_1 = y_2 + y_3$ $c_2 = y_0 - y_3$ $c_3 = 74*y_1$ $x_0 = ((28*(c_0+(c_1<<1))+c_3)+\text{rnd\_factor})>>\text{shift\_bits}$ $x_1 = ((28*((c_2<<1)-c_1+c_3)+\text{rnd\_factor})>>\text{shift\_bits}$ $x_2 = (74*(y_0-y_2+y_3))+\text{rnd\_factor})>>\text{shift\_bits}$ $x_3 = ((28*((c_0<<1)+c_2)-c_3)+\text{rnd\_factor})>>\text{shift\_bits}$ [Eqn. 54]

where $c_0$, $c_1$, $c_2$, and $c_3$ are intermediate values, shift_bits=7 bits, and rnd_factor=(1<<shift_bits)>>1=64.

Again note that the variable shift_bits can be any positive integer K (e.g., K=1, 2, 10, 20, and so forth) depending on the implementation, where the output is down-shifted by K bits.

The total savings for multiplications is from sixteen in full matrix multiplication to five in the above proposed fast implementation of both forward and inverse (28,56) DST. The percentage savings in multiplications is (16-5)/16*100=68.75%. For additions, the number decreases from twelve in full matrix multiplication to eleven in the above fast implementation. Note that, in general, additions and shifts are considered cheap in hardware. Furthermore, the multiplications in the proposed scheme are only by two different numbers: '28' and '74' only, which can be stored in using two different registers.

Although the present disclosure discusses some specific examples intra-prediction modes (i.e. in Table 4), this is not intended to limit the scope. In other embodiments, other prediction modes for which horizontal and vertical transforms are chosen may also be added without departing from the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for decoding video, comprising:
mapping coefficients of an incoming video bitstream to an M×N transformed coefficient matrix according to an intra-prediction mode, where prediction is performed from pixels on a boundary of a current block being coded in a current frame made of the incoming video bitstream;
determining to apply a first one of discrete cosine transform (DCT) and discrete sine transform (DST) as an inverse vertical transform and a second one of DCT and DST as an inverse horizontal transform for the transformed coefficient matrix according to the intra-prediction mode; and performing an inverse transform comprising the inverse vertical transform and the inverse horizontal transform, using the first one of DCT and DST for the inverse vertical transform and the second one of DCT and DST for the inverse horizontal transform to calculate an approximation of an error prediction residual.

2. The method of claim 1, wherein performing the inverse transform comprises:

performing the inverse vertical transform on each of the N columns of the transformed coefficient matrix using the first one of DCT and DST; and performing the inverse horizontal transform on each of the M rows of the output of the inverse vertical transform using the second one of DCT and DST to calculate the approximation of the error prediction residual.

3. The method of claim 1, wherein performing the inverse Transform comprises:

performing the inverse horizontal transform on each of the M rows of the transformed coefficient matrix using the second one of DCT and DST; and performing the inverse vertical transform on each of the N columns of the output of the inverse horizontal transform using the first one of DCT and DST to calculate the approximation of the error prediction residual.

4. The method of claim 1, wherein performing the DST comprises performing an inverse DST type 4.

5. The method of claim 1, wherein performing the DST comprises performing an inverse DST type 7.

6. The method of claim 5, wherein the inverse DST type 7 is a fast implementation for a 4×4 inverse DST Type 7 with eight multiplications.

7. The method of claim 5, wherein at least one of a plurality of elements in an inverse DST Type-7 matrix is adjusted such that the plurality of elements share a common factor, reducing the number of multiplications to five.

8. A method for encoding video, comprising:

performing intra-prediction on an input matrix of an M×N input image block (X) based on an intra-prediction mode to generate $\tilde{X}$ and obtain an M×N intra-prediction residue matrix (E);

determining to apply a first one of discrete cosine transform (DCT) and discrete sine transform (DST) as a horizontal transform and a second one of DCT and DST as a vertical transform for E according to the intra-prediction mode; and performing a forward transform comprising the horizontal transform and the vertical transform, using the first one of DCT and DST as the horizontal transform and the second one of DCT and DST for the vertical transform to calculate a transformed coefficient matrix ($E_2$).

9. The method of claim 8, wherein performing the forward transform comprises:

performing the horizontal transform on each of the M rows of E using the first one of DCT and DST; and performing the vertical transform on each of the N columns of the output of the horizontal transform using the second one of DCT and DST to calculate the transformed coefficient matrix ($E_2$).

10. The method of claim 8, wherein performing the forward transform comprises:

performing the vertical transform on each of the N columns of E using the second one of DCT and DST; and performing the horizontal transform on each of the M rows of the output of the vertical transform using the first one of DCT and DST to calculate the transformed coefficient matrix ($E_2$).

11. The method of claim 8, wherein performing the DST comprises performing the DST type 4.

12. The method of claim 8, wherein performing the DST comprises performing the DST type 7.

13. The method of claim 12, wherein the DST type 7 is a fast implementation for a 4×4 DST Type 7 with nine multiplications.

14. The method of claim 12, wherein at least one of a plurality of elements in a DST Type-7 matrix is adjusted such that the plurality of elements share a common factor, reducing the number of multiplications to five.

15. An apparatus for decoding video, comprising:

an inverse quantizer configured to map quantized transformed coefficient indices obtained from an incoming video bitstream to an M×N transformed coefficient matrix according to an intra-prediction mode, where prediction is performed from pixels on a boundary of a current block being coded in a current frame made of the incoming video bitstream; and an inverse transform unit configured to determine to apply a first one of discrete cosine transform (DCT) and discrete sine transform (DST) as an inverse vertical transform and a second one of DCT and DST as an inverse horizontal transform for the transformed coefficient matrix according to the intra-prediction mode, and perform an inverse transform comprising the inverse vertical transform and the inverse horizontal transform, using the first one of DCT and DST for the inverse vertical transform and the second one of DCT and DST for the inverse horizontal transform to calculate an approximation of an error prediction residual.

16. The apparatus of claim 15, wherein the inverse transform unit is further configured to perform the inverse vertical transform on each of the N columns of the transformed coefficient matrix using the first one of DCT and DST, and perform the inverse horizontal transform on each of the M rows of the output of the inverse vertical transform using the second one of DCT and DST to calculate the approximation of the error prediction residual.

17. The apparatus of claim 15, wherein the inverse transform unit is further configured to perform the inverse horizontal transform on each of the M rows of the transformed coefficient matrix using the second one of DCT and DST, and perform the inverse vertical transform on each of the N columns of the output of the inverse horizontal transform using the first one of DCT and DST to calculate the approximation of the error prediction residual.

18. The apparatus of claim 15, wherein the inverse transform unit is further configured to perform an inverse DST type 4 when using DST for at least one of the inverse vertical transform and the inverse horizontal transform.

19. The apparatus of claim 15, wherein the inverse transform unit is further configured to perform an inverse DST type 7 when using DST for at least one of the inverse vertical transform and the inverse horizontal transform.

20. The apparatus of claim 19, wherein the inverse DST type 7 is a fast implementation for a 4×4 inverse DST Type 7 with eight multiplications.

21. The apparatus of claim 19, wherein at least one of a plurality of elements in an inverse DST Type-7 matrix is adjusted such that the plurality of elements share a common factor, reducing the number of multiplications to five.

22. An apparatus for encoding video, comprising:
- a unified intra-prediction unit configured to perform intra-prediction on an input matrix of an M×N input image block (X) based on an intra-prediction mode to generate $\tilde{X}$ and obtain an M×N intra-prediction residue matrix (E); and
- a transform unit configured to determine to apply a first one of discrete cosine transform (DCT) and discrete sine transform (DST) as a horizontal transform and a second one of DCT and DST as a vertical transform for E according to the intra-prediction mode, and perform a forward transform comprising the horizontal transform and the vertical transform, using the first one of DCT and DST as the horizontal transform and the second one of DCT and DST for the vertical transform to calculate a transformed coefficient matrix ($E_2$).

23. The apparatus of claim 22, wherein the transform unit is further configured to perform the horizontal transform on each of the M rows of E using the first one of DCT and DST, and perform the vertical transform on each of the N columns of the output of the horizontal transform using the second one of DCT and DST to calculate the transformed coefficient matrix ($E_2$).

24. The apparatus of claim 22, wherein the transform unit is further configured to perform the vertical transform on each of the N columns of E using the second one of DCT and DST, and perform the horizontal transform on each of the M rows of the output of the vertical transform using the first one of DCT and DST to calculate the transformed coefficient matrix ($E_2$).

25. The apparatus of claim 22, wherein the transform unit is further configured to perform a DST type 4 when using DST for at least one of the horizontal transform and the vertical transform.

26. The apparatus of claim 22, wherein the transform unit is further configured to perform a DST type 7 when using DST for at least one of the horizontal transform and the vertical transform.

27. The apparatus of claim 22, wherein the DST type 7 is a fast implementation for a 4×4 DST Type 7 with nine multiplications.

28. The apparatus of claim 22, wherein at least one of a plurality of elements in a DST Type-7 matrix is adjusted such that the plurality of elements share a common factor, reducing the number of multiplications to five.

* * * * *